United States Patent [19]

Smith, Jr.

[11] Patent Number: 5,222,896

[45] Date of Patent: Jun. 29, 1993

[54] POLYHEDRAL APPROXIMATION OF A SPHERICAL BODY AND TWO-DIMENSIONAL PROJECTIONS THEREFROM

[75] Inventor: Thomas E. Smith, Jr., Atlanta, Ga.

[73] Assignee: British Technology Group USA Inc., Gulph, Pa.

[21] Appl. No.: 742,895

[22] Filed: Aug. 8, 1991

[51] Int. Cl.⁵ ........................ G09B 27/08; G09B 27/06
[52] U.S. Cl. ..................................... 434/135; 434/137
[58] Field of Search ............................... 434/135, 137

[56] References Cited

U.S. PATENT DOCUMENTS

| | | | |
|---|---|---|---|
| 374,789 | 12/1887 | French | 434/137 |
| 1,081,207 | 12/1913 | Cahill | 434/137 |
| 2,153,053 | 4/1939 | Smith | 434/135 |
| 2,352,380 | 6/1944 | Gingery | 434/135 |
| 2,354,381 | 7/1944 | Kennedy | 434/137 |
| 2,369,103 | 2/1945 | Clark | 434/135 |
| 2,393,676 | 1/1946 | Fuller | 434/135 |
| 2,406,164 | 8/1946 | Raisz | 434/135 |
| 2,424,601 | 7/1947 | Crouch | 434/135 |
| 2,436,860 | 3/1948 | Fisher | 434/135 |
| 3,248,807 | 5/1966 | Janus | 434/135 |
| 3,331,145 | 7/1967 | Amdahl | 434/137 |
| 3,584,400 | 6/1971 | Voges | 434/135 |
| 4,613,391 | 9/1986 | Herlin et al. | 156/213 |
| 4,620,842 | 11/1986 | Wang | 434/135 |
| 4,773,861 | 9/1988 | Dufour | 434/135 |

FOREIGN PATENT DOCUMENTS

| | | |
|---|---|---|
| 1109629 | 1/1956 | France. |
| 1164405 | 10/1958 | France. |
| 57244 | 8/1945 | Netherlands. |
| 1444480 | 7/1976 | United Kingdom. |

OTHER PUBLICATIONS

Scientific American, pp. 81, 84 (Aug. 1987).
"The New Shape of the World", Time, p. 127 (Nov. 1988).
The Dymaxion Map (1982) by Buckminster Fuller Society Dec. 1982.
"The National Geographic Society", by C. D. B. Bryan.

Primary Examiner—William H. Grieb
Attorney, Agent, or Firm—Fitzpatrick, Cella, Harper & Scinto

[57] ABSTRACT

A polyhedral approximation of an Earth globe or other non-planar surface and a projection of such non-planar surface to a two-dimensional form with a practical minimum of distortion of principal and secondary features is disclosed. Vertices are selected on the non-planar surface to be mapped so as to define identifiable panels which are suitable for individual study because of their incorporation of at least one of the principal features wholly within one of the panels. Vertices are selected so that the panels are individually shaped and sized to accommodate at least a majority of at least one of the principal features.

56 Claims, 20 Drawing Sheets

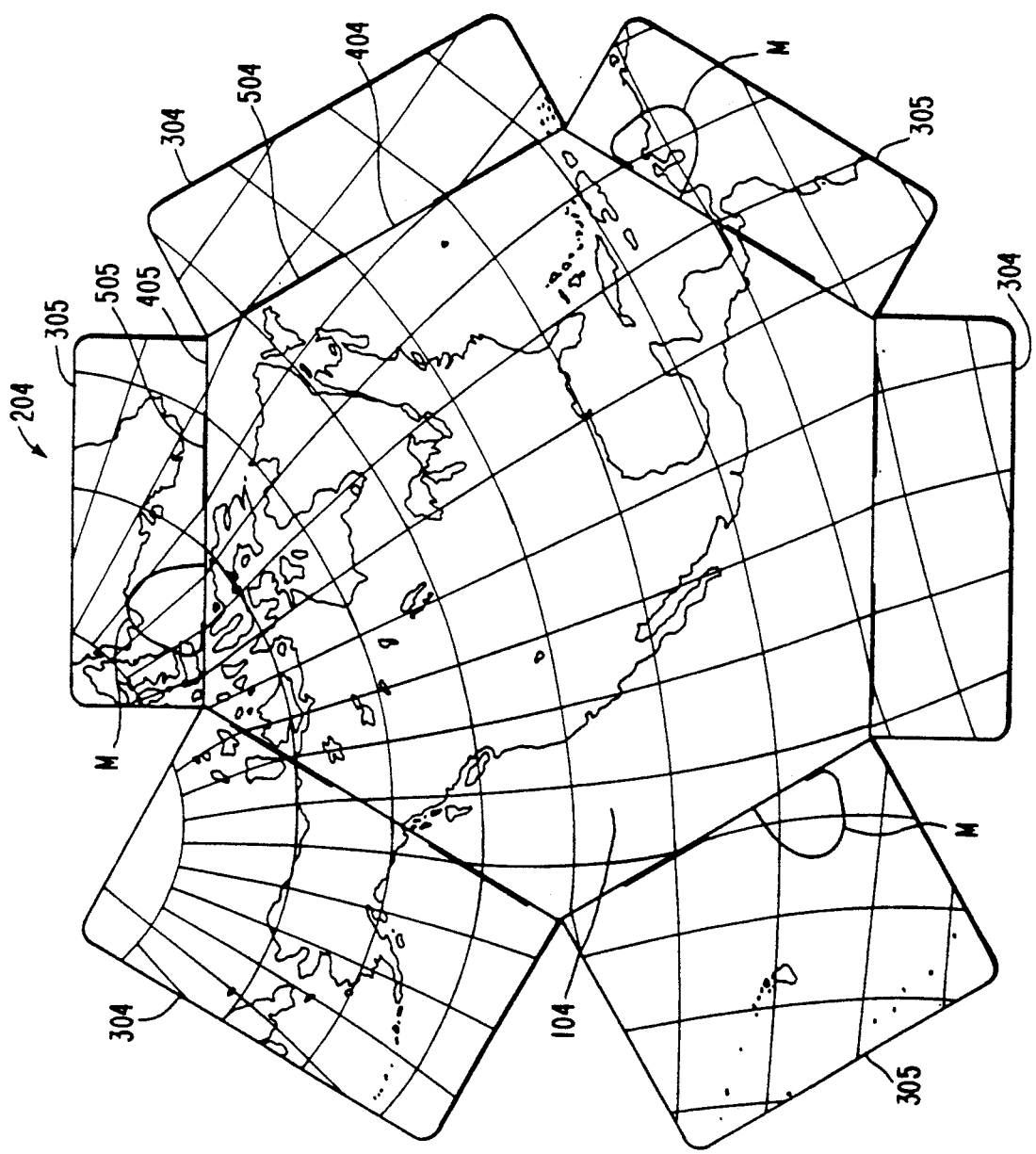

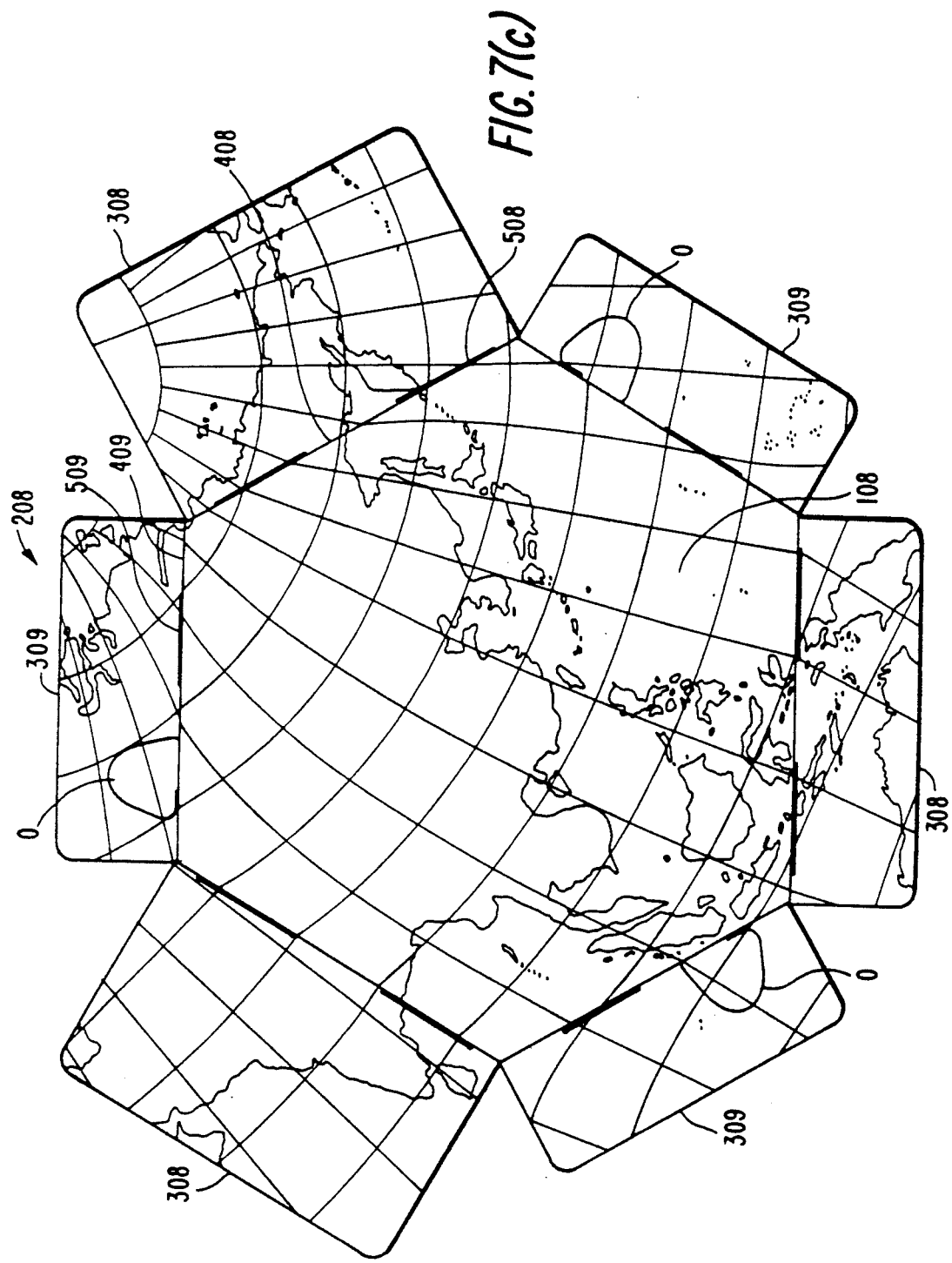

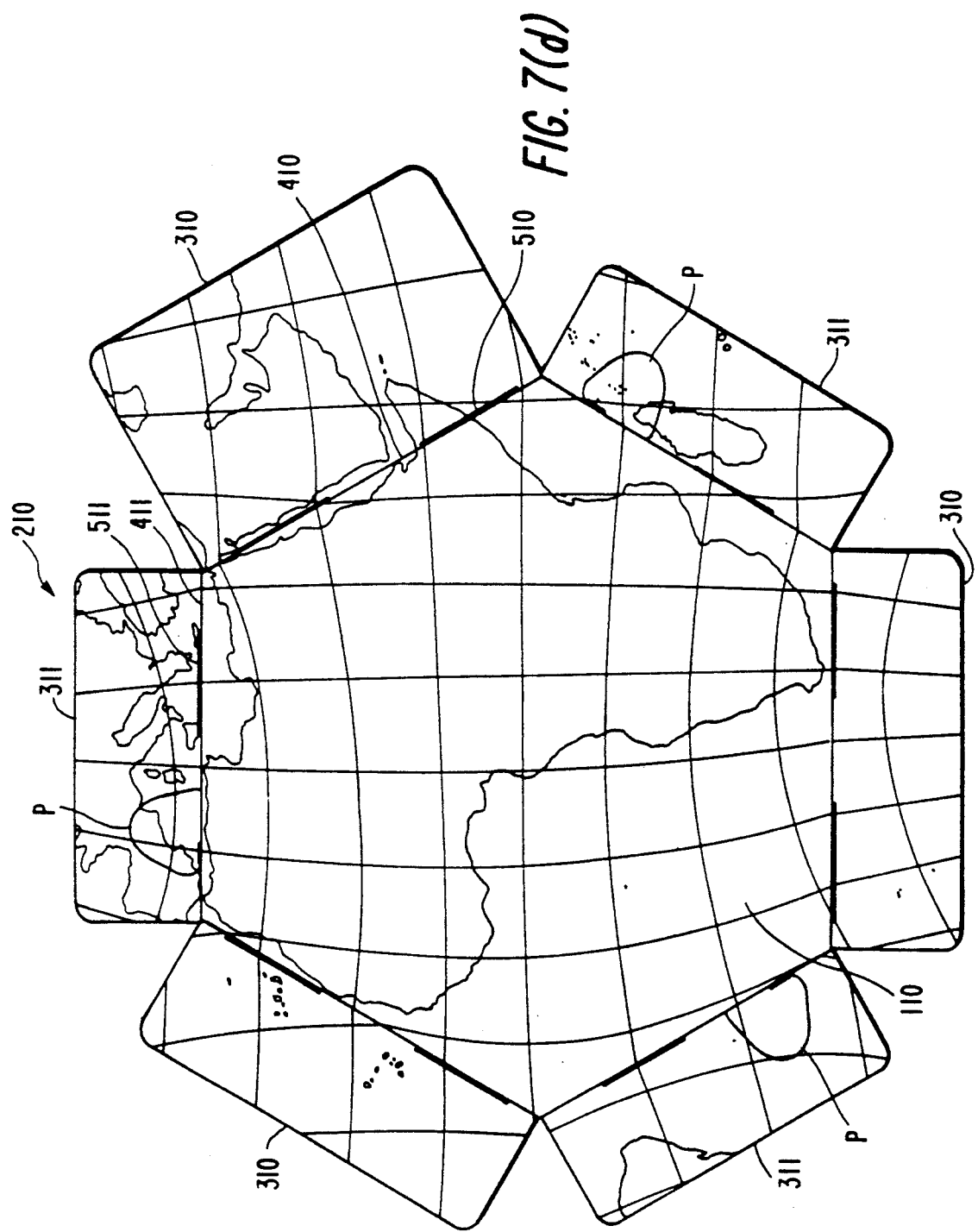

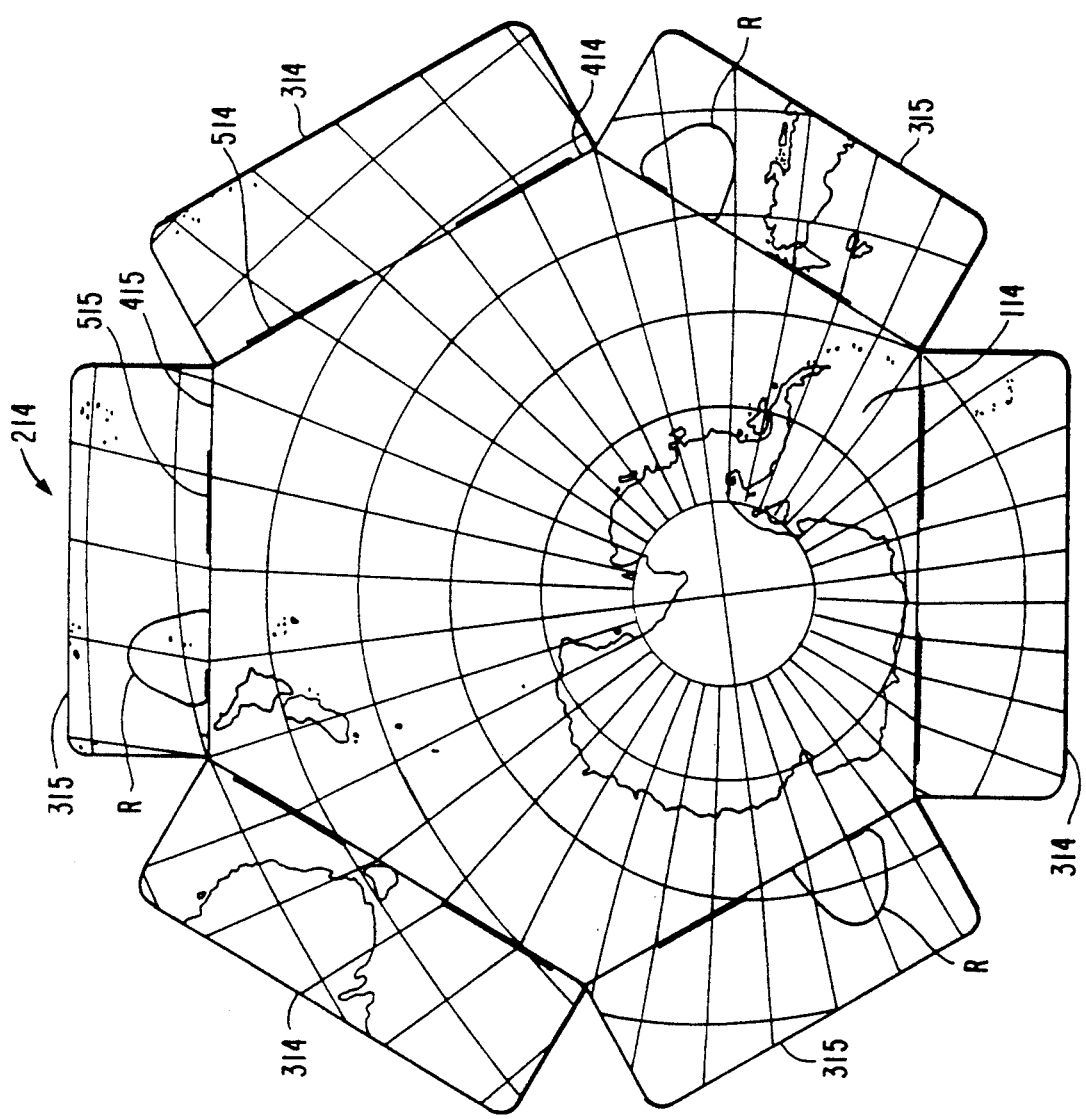

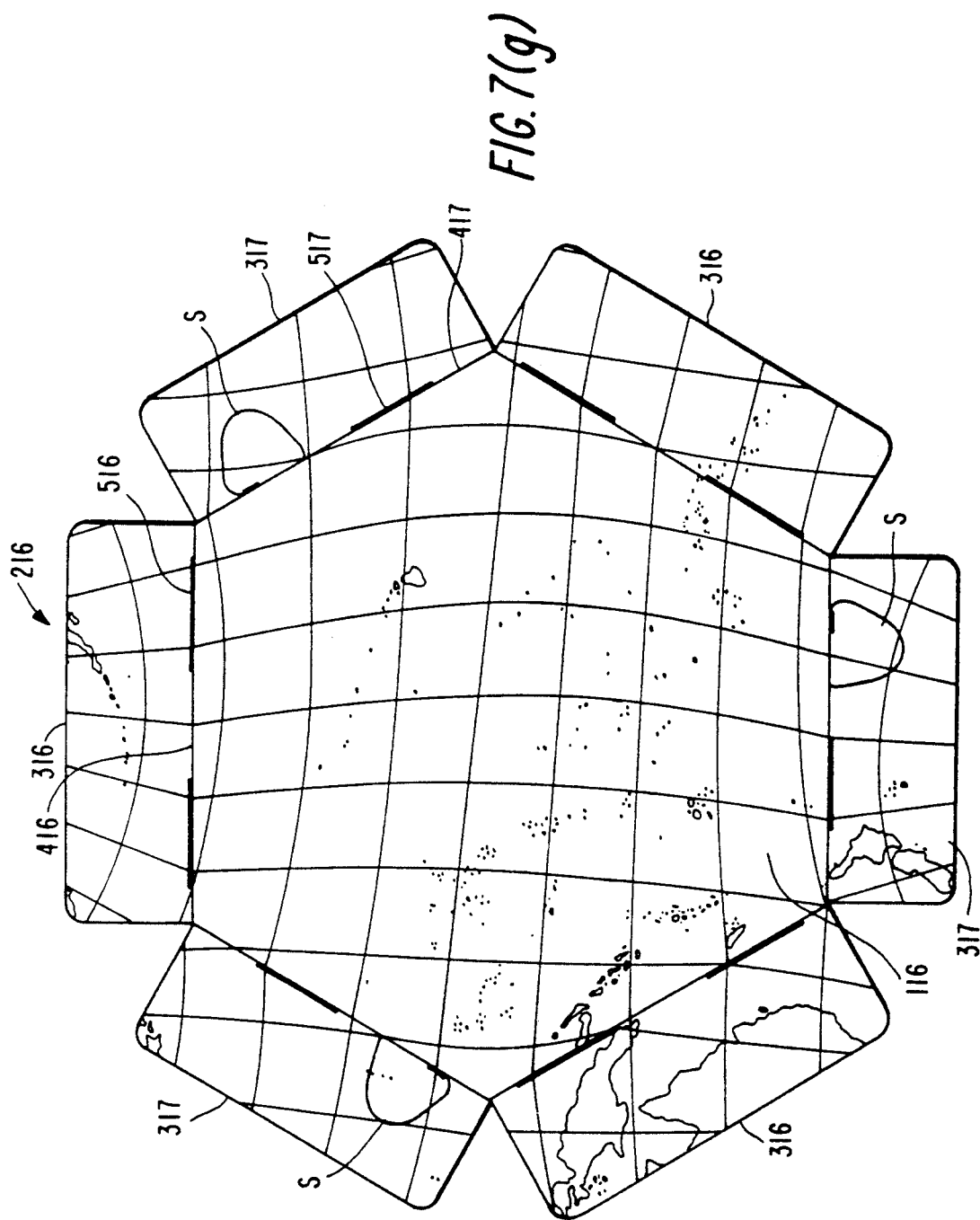

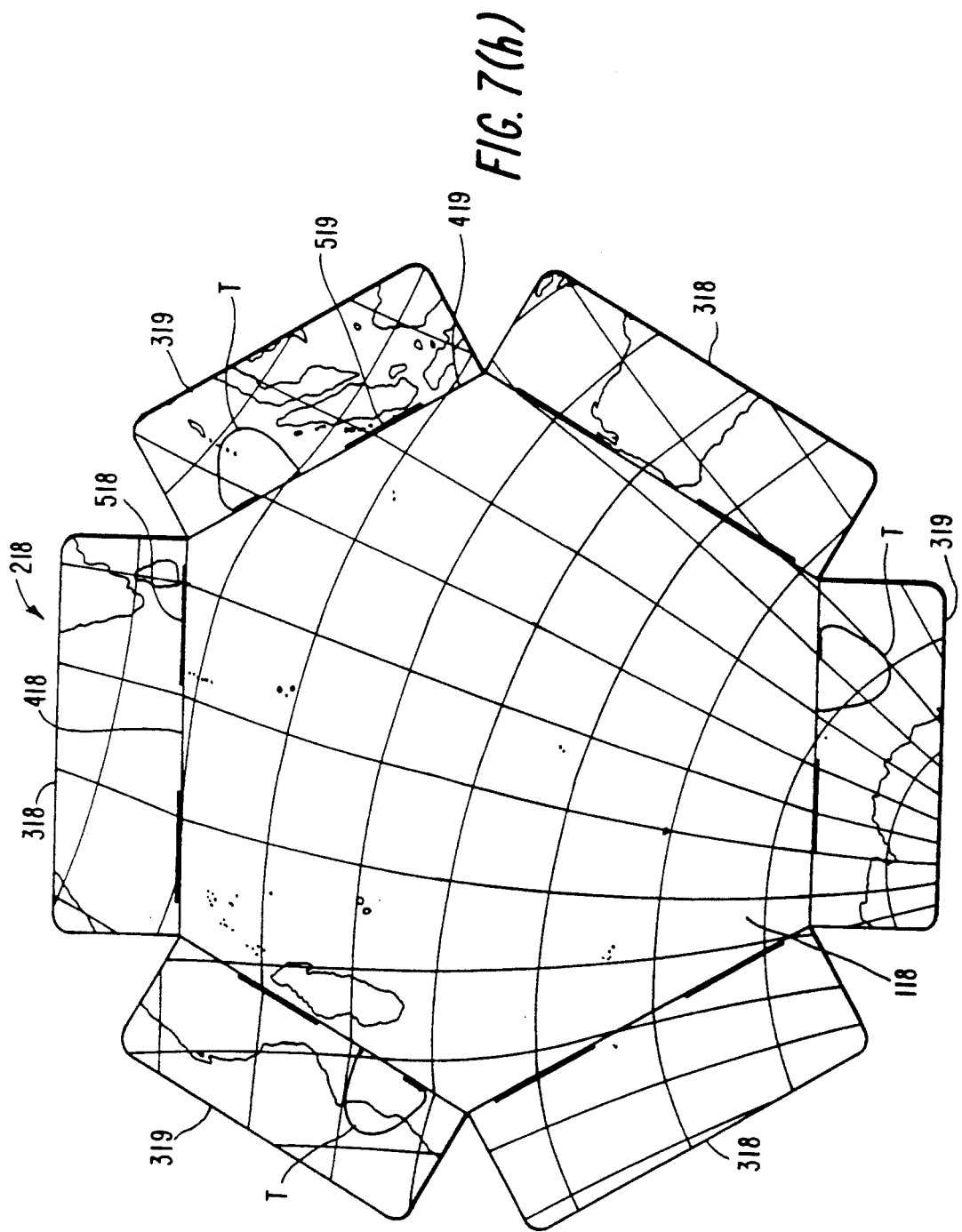

POLYHEDRAL APPROXIMATION OF A SPHERICAL BODY AND TWO-DIMENSIONAL PROJECTIONS THEREFROM

BACKGROUND OF THE INVENTION

1. Field of the Invention

The present invention relates to the projection of principal and secondary features from the surface of an Earth globe or non-planar surface, such as a celestial sphere, spherical body and the like, with a practical minimum of distortion of those principal and secondary features. The principal features are projected onto identifiable panels which are suitable for individual study. The panels may then be assembled into a polyhedral approximation of the Earth globe or other celestial sphere, spherical body and the like and are therefore simultaneously useful in both their two and three dimensional forms.

2. Description of the Prior Art

It is fundamentally impossible to project without distortion a non-planar surface such as that of the Earth or other spherical body onto a flat surface. This is a mathematical truism. The curvature of a spherical body's surface can only be presented undistorted, that is, preserving areas, shapes and angles, when projected on another spherical body. Although such three-dimensional maps are inherently more accurate, they suffer the problem of being unwieldly and not very useful as training tools. There is no practical substitute for flat, two-dimensional maps, particularly in the educational process. Nor is there any other practical way to create maps which can be printed in atlases, text books and the like, and which can be given to students on inexpensive paper to work with while learning.

Accordingly, because of inconvenience of working with globes and other three-dimensional maps, and the advantages of having the entire surface of the Earth and other three-dimensional bodies projected onto a flat surface or surfaces, cartographers have long sought to develop means for projecting spherical surfaces onto flat pieces of paper with a minimum of distortion of the features therein. In 1989 the U.S. Geological Survey, Department of the Interior, published *An album of Map Projections*, Professional Paper 1453, in an effort to categorize the existing known projections. That publication states that there are literally hundreds of known projection systems. Until at least recently, the map most generally used in schools, textbooks and in the news media to represent the entire Earth has been the Mercator projection, devised in the sixteenth century. However, while the Mercator projection preserves angles and therefore is particularly useful for marine charts, it presents a misleading view of the world because of the excessive distortion of areas and distances as one proceeds farther from the equator. Thus, for example, the Mercator projection shows the size of Greenland nearly as large as the size of South America when in actuality it is only one-sixteenth the size of South America.

The National Geographic Society had for more than 50 years utilized the Van der Grinten Projection for its world maps, despite the excessive distortion contained therein, namely, for example, +258% for Canada, +68% for the U.S., +14% for South America, +223% for the U.S.S.R., 7% for Africa and +61% for China. In 1988 the National Geographic Society discontinued its use of the Van der Grinten projection and adopted the Robinson Projection in an effort to more accurately portray the areas of the principal features of Earth on flat surfaces. The Robinson Projection was developed in 1963 and reduces some of the distortion of Earth's land masses. However, while areas in the Robinson map are relatively correct, shapes far from the equator, such as Alaska, are stretched almost out of recognition. Nor does the Robinson projection provide a means for individually studying the major land masses of Earth and it cannot be assembled into a three-dimensional form.

The Dymaxion Map, copyrighted in 1982 by Buckminster Fuller Institute, projects the Earth globe onto 20 identical equilateral triangular segments and shows, with a minimum of distortion, all the land masses of Earth on a single flat sheet of paper. The sheet can be folded along the lines of its constituent triangles into an icosahedral three dimensional representation of the globe. However, the Dymaxion Map is not particularly useful for educational or even entertainment purposes. If broken apart into individual triangles, the land masses are cut into incoherent portions and, if not broken apart into individual triangles, the Dymaxion Map is ungainly when laid out flat in one piece and very hard to interpret as a map of continents and countries.

In C.D.B. Bryan's review of the National Geographic's first 100 years there is disclosed a picture of a polyhedral globe. The globe is a 24-faceted shell, each facet side having four edges and the identical "kite" shape. The Equator is a plurality of regular octagons running around the mid-point. However, National Geographic's 24 kite-shaped pieces chop most of the land masses to shreds when disassembled and is therefore only useful in its three-dimensional form.

Numerous other projections have been known in the art. U.S. Pat. No. 2,153,053 discloses a polyhedral approximation of the Earth globe having twelve regular pentagonal sides surrounding a collapsible frame. It is designed for school use. However, upon disassembly its land masses are cut.

U.S. Pat. No. 2,393,676 depicts a projected map having a plurality of square and triangular sections To facilitate cartographic construction, all edges are on great circles. One embodiment has six equilateral square sections and eight equilateral triangles.

None of the above described map making systems have achieved that combination of a two and three-dimensional map wherein distortion is kept to a minimum and principal features are easily studied in two-dimensional form.

SUMMARY OF THE INVENTION

It is an object of the invention to combine a two-dimensional projection of a spherical body for teaching and learning with a three-dimensional globe-like structure which students can assemble from the combined projection.

It is also an object of the present invention to project onto a flat surface the features of a spherical body with a practical minimum of distortion of its distances, sizes and shapes.

It is another object of the invention to project major land masses or other principal features of a spherical body onto contiguous segments of a flat map, for greater ease of teaching and study, whereby the major land masses or principal features may be separated for individual study.

It is yet another object of the invention to provide a method by which there may be simultaneously generated two-dimensional and three-dimensional mappings of virtually any spherical, celestial or other non-planar surface with randomly located principal features, such that each such map of a spherical, celestial or other non-planar surface is flat for conventional teaching and learning and can be assembled into a three-dimensional globe-like structure for more complete understanding and comprehension of the mapped entity.

In accordance with these and other objects which will become clear in light of the detailed description and drawings, there is provided in one aspect of the invention a method of forming a polyhedral approximation of a non-planar surface to be mapped with a practical minimal of distortion of its principal features, the method comprising the steps of selecting a plurality of vertices on the non-planar surface, the plurality of vertices dividable into vertex subgroups each of at least three vertices, the vertices in each of the vertex subgroups on essentially a single plane and defining an individual face area on the non-planar surface, and wherein the subgroups of vertices are selected so as to incorporate at least one of the principal features wholly within a panel area subgroup, the panel area consisting of at least one contiguous individual face area defined by the vertex subgroups on the non-planar surface; generating a separate panel of a size corresponding to each of said panel areas on the non-planar surface; and projecting features from each of said panel areas on the non-planar surface to its corresponding panel, wherein the panels comprise at least one flat polygonal facet corresponding to one of the individual face areas.

In another aspect of the invention, there is provided a polyhedral approximation of an Earth globe with minimal distortion of its principal features, the polyhedral approximation of an Earth globe comprising a plurality of flat polygonal panels which when laid flat form a projection of the surface of the Earth, wherein said panels are capable of being connected along their edges and arranged generally like a sphere, at least two of said polygonal panels being of different sizes so as to accommodate major portions of the principal features on each, and at least one of the panels being an irregular polygon. Each of the polygonal panels has a main portion and a plurality of foldable tab portions, the main portion also having means for securing said tab portions, e.g. a plurality of slots into which the tab portions of adjacent panels are inserted to interconnect the panels or alternately, magnetic, hook-and-pile or other fastening means on the tab portions, and at least one of the tab portions having depicted thereon an area of the Earth's surface duplicative of the area depicted on a main portion of the interconnected adjacent polygon.

In yet a further aspect of the invention there is provided a polyhedral approximation of a spherical body, with a plurality of facets arranged to achieve a practical minimum of distortion, the facets comprising an upper six-sided facet at an uppermost portion of the body; a lower six-sided facet at a lowermost portion of the body; a band of trapezoid shaped facets extending around an equator of the body; a pair of bands of triangle shaped facets each extending longitudinally around the body, one of the bands of triangle shaped facets extending from the band of trapezoid shaped facets to the upper six-sided facet and the other of said bands of triangle shaped facets extending from the band of trapezoid shaped facets to the lower six-sided facet.

In still yet another aspect of the invention, there is provided a projection of a three dimensional object comprising a plurality of polygonal panels arranged to achieve a practical minimum of distortion of principal features on the surface of the object, comprising a first irregular hexagonal panel onto which is projected an uppermost portion of the object; a second irregular hexagonal panel onto which is projected a lowermost portion of the object; a series of triangle shaped polygons onto which are projected a substantial portion of an area extending along the equator of the object, and a pair of series of trapezoid shaped panels comprising the remainder of the surface of the polyhedral globe, one of the series having projected thereon an area of the surface of the object extending above the area projected onto said triangles and the other of said series having projected thereon an area extending below an area projected onto said triangles.

DETAILED DESCRIPTION

Figure 1:
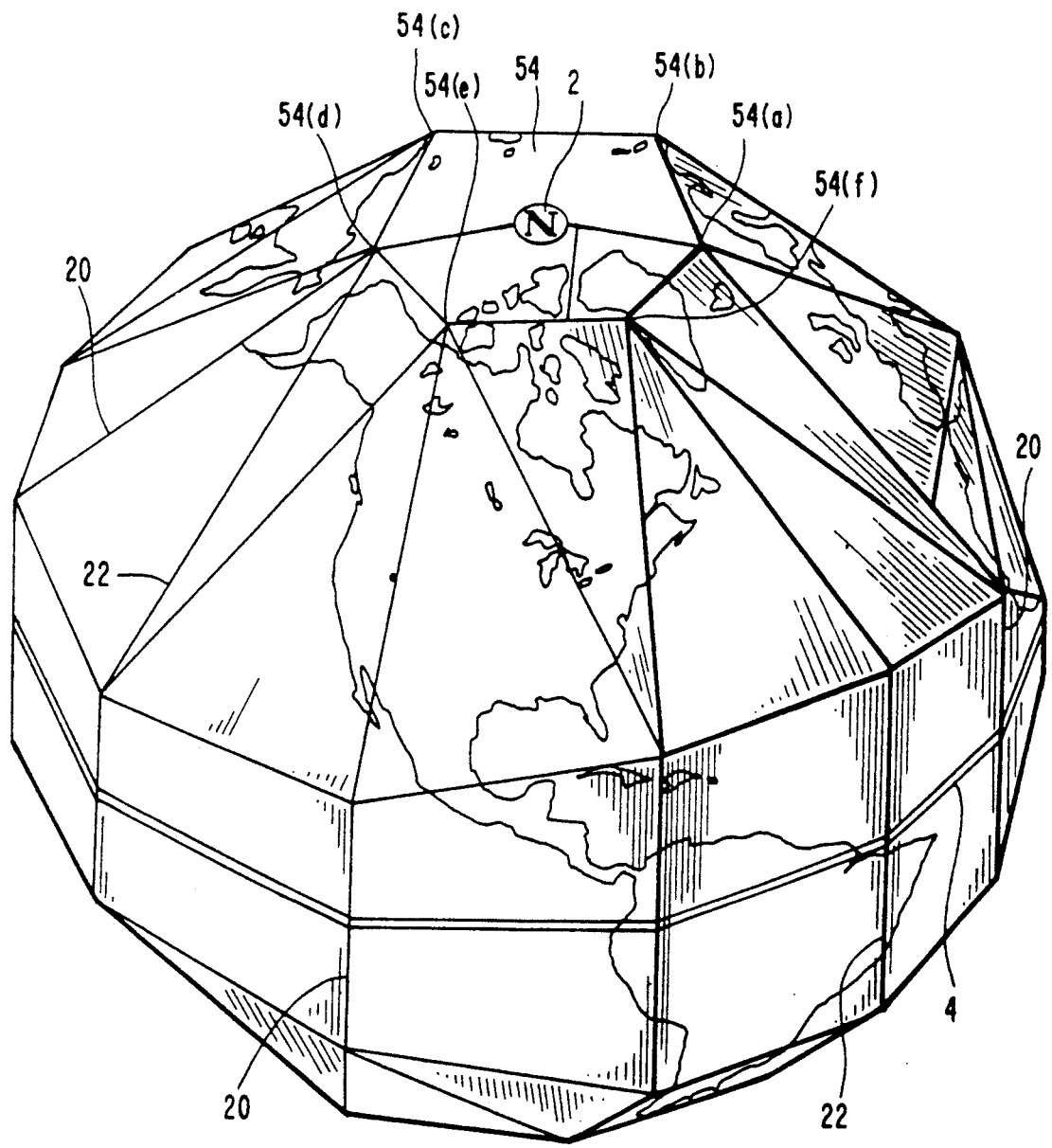
FIG. 1 is a perspective view of a first embodiment of the invention as applied to an Earth globe.
Figure 2:
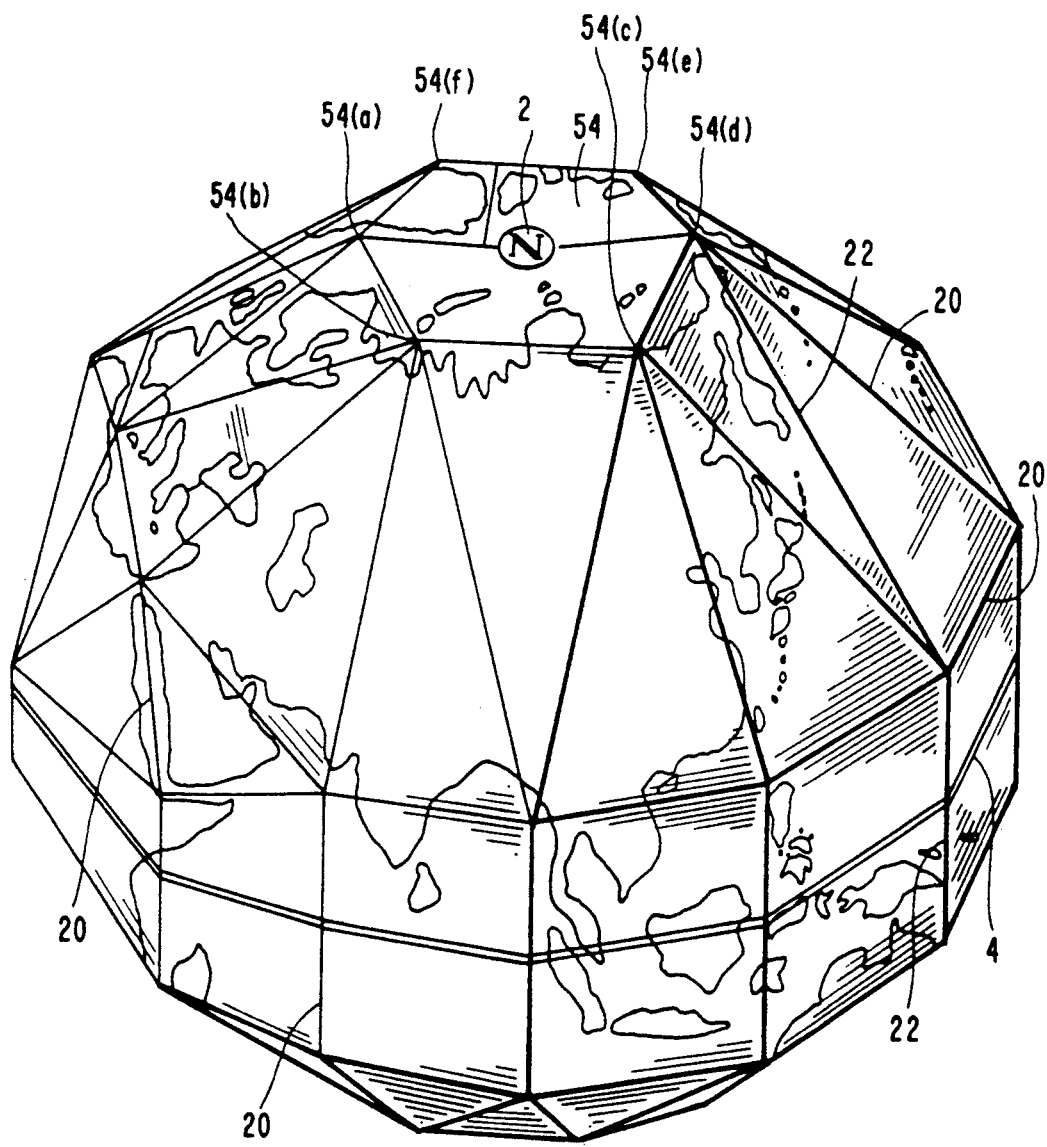
FIG. 2 is a perspective view of the first embodiment shown in FIG. 1 but from a different angle.
Figure 3:
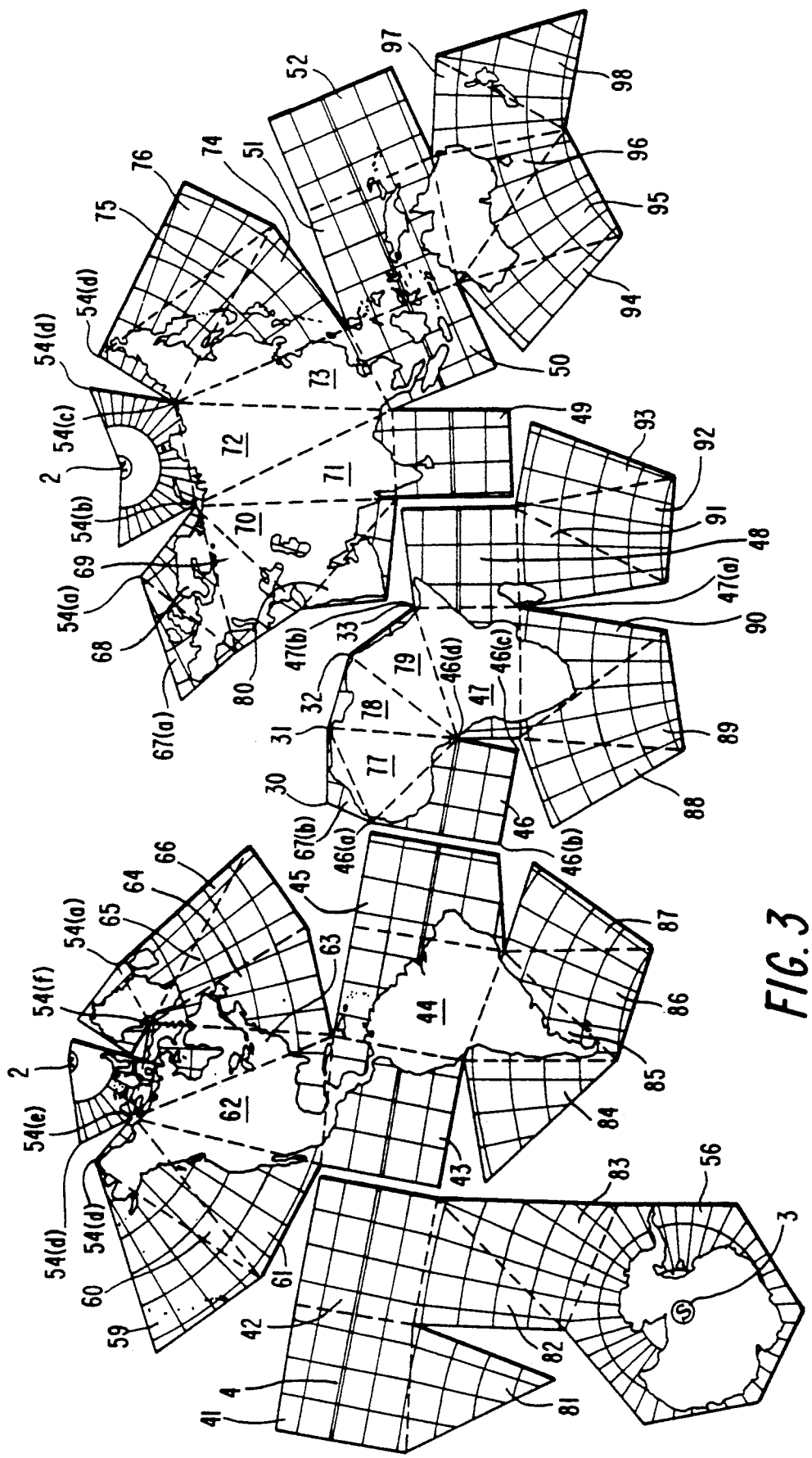
FIG. 3 is a layout of flat panels of the first embodiment of the invention.

FIGS. 1-3 illustrate a first embodiment of the invention wherein an Earth globe is projected onto a flat surface with minimal distortion and with all major continental land masses, including the Eurasian land mass, shown on their own flat map segments. While the first embodiment is explained in detail below with respect to the mapping of an Earth globe, it will become clear that the identical method may be applied to the mapping of other three-dimensional entities, including application to celestial bodies such as Earth's Moon or Mars, to celestial spheres of stars, galaxies and constellations and even to human organs such as the brain.

FIGS. 1 and 2 are perspective views of the first embodiment in its three-dimensional form as applied to an Earth globe. FIG. 3 illustrates the first embodiment in its two-dimensional form wherein the features of the Earth globe depicted in FIGS. 1 and 2 are projected onto a flat layout which, as explained later, has been broken into segments for individual viewing of major continental land mass.

FIGS. 1 and 2 illustrate from two angles a polyhedral approximation of an Earth globe made up of a total of 54 facets. Double line 4 identifies the equator and uppermost point 2 identifies the true North Pole. FIG. 1 illustrates the polyhedral approximation of an Earth globe as viewed from above North America and therefore FIG. 1 contains thereon all or part of the readily identifiable land masses of North America, Greenland, South America, Africa and Europe, each of which are principal features of Earth. FIG. 2 shows the polyhedral approximation of the Earth globe illustrated in FIG. 1 but as viewed from above Central Asia and therefore contains thereon the readily identifiable land masses of Asia, Europe, the Middle East, the Far Eastern Pacific Island Nations and portions of Africa and Australia, each of which constitutes one of Earth's principal or secondary features. While for clarity FIGS. 1 and 2 illustrate only the outlines of the principal and most of the secondary land masses, it is to be understood that additional mapping detail of the type desired ma be incorporated thereon and that it is within the skill of an ordinary cartographer to add that information.

Each single line on FIGS. 1 and 2 represents the edge of a facet (or, in two cases to be explained later, cuts across a divided facet). As will be explained more fully below, each facet edge will either be a cut, which completely separates two adjacent facets when the map of the first embodiment is laid flat, or a fold wherein an edge between two facets is created simply by folding the panel along a line representing an edge between two polygons. Adjacent facets separated by a fold appear as part or all of a single panel when laid flat. Figs. 1 and 2 illustrate cut lines 20 bolder than thinner fold lines 22. (On FIGS. 1 and 2 only a representative number of cut lines 20 and fold lines 22 have been labelled with reference numerals so as to maintain clarity of the figures.)

In this first embodiment, two irregular hexagon-shaped facets 54,56 are positioned over the respective North and South Poles 2,3, the South Polar facet shown only in FIG. 3. Twelve trapezoid-shaped facets 41-52 are located in a band extending around equator 4. Twenty-two triangle-shaped facets 59-80 are located generally in a band around the Earth globe to connect the band of trapezoid shaped facets 41-52 to North Polar hexagon-shaped facet 54 and eighteen triangle shaped facets 81-98 are located in a band around the Earth globe to connect the band of trapezoid shaped facets 41-52 to South Polar hexagon-shaped facet 56.

Vertices of the aforementioned facets are selected in accordance with the method of the invention to define the shape of the eventual polyhedral map together with any contained folds and cuts. Any three vertices on the surface of the Earth globe will define a triangle shaped facet and therefore any triangle, whether equilateral or not, can be a facet. With regard to hexagons, trapezoids and other polygons, they can be perfect facets only if their vertices fall along a great circle or a small circle, that is, the circle created when a plane passes through a sphere. Alternatively, in compelling circumstances, vertices can be located at a different location at the cost of added distortion.

Turning next to actual selection of each vertex, as well as the designation of connecting lines as fold lines or cut lines, we start with vertices for polar facets 54,56.

North Polar hexagon-shaped facet 54 and South Polar hexagon-shaped facet 56 are situated at the uppermost and lowermost caps of the polyhedral approximation of an Earth globe and have projected thereon North Pole 2 and Antarctica, respectively. All six vertices 54(a)-54(f) of North Polar facet 54 are selected to lie on the 73rd north parallel and on the meridians of longitude at 10° W, 52° E, 131° E, 167° W, 127° W and 58° W, respectively.

To separate the Eurasian land mass from North America, North Polar facet 54 is cut in half in a zigzag pattern through the facet, running straight from the vertex 54(a) at 73° N–10° W to North Pole 2, and thence straight to the vertex 54(d) at 73° N–167° W. Small cuts are then be made along two of the three edges on the Eurasian side of North Polar facet 54. The cuts extend from vertex 54(d) at 73° N–167° W to vertex 54(c) at 73° N–131° E and from vertex 54(a) at 73° N–10° W to vertex 54(b) at 73° N–52° E. A fold rather than a cut is made through the Taymyr Peninsula on the line from vertex 54(b) to vertex 54(c).

Two cuts are also made along the Canadian side of North Pole 2. The first cut is north of Alaska from vertex 54(d) to vertex 54(e) at 73° N–127° W. The second cut starts at Baffin Bay vertex 54(f) at 73° N–58° W and proceeds along the fold line toward vertex 54(e) to a longitude of about 79° W, thence slightly east of north to an intersection with the cut between vertex 54(a) and North Pole 2 at a latitude of about 85° N. This latter zig-zag cut is to allow Greenland to be shown contiguously when its panel is laid flat.

South Polar hexagon-shaped facet 56 is made larger than North Polar hexagon-shaped facet 54 so as to contain all of Antarctica. The six vertices 56(a)-56(f) of South Polar facet 56 lie on the 63rd south parallel and on meridians of longitude at 60° E, 110° E, 160° E, 154° W, 81° W and 35° W, respectively. Due to the lesser number of land masses in the southern hemisphere, as well as their farther proximity from South Pole 3, no cuts are needed through South Polar facet 56.

The band of trapezoid shaped facets 41-52, each with a pair of parallel substantially north-south edges, stretches around equator 4 and the facets do not deviate substantially from a rectangular shape until one reaches facets 46 and 47, which extend over the African continent. Thus, except for the vertices defining the edge between trapezoids 46 and 47, the vertices of the band of trapezoid shaped facets 44-52 are mirrored generally at equal distances above and below the Equator.

The band of trapezoid shaped facets is laid out as polygons 41-52 in FIG. 3. Starting at the easterly edge of the African continent, the trapezoid shaped facets are located as follows:

Trapezoid shaped polygon 48 is defined by vertices 11° N–44° E, 11° S–44° E, 23° N–66° E and 23° S–66° E.

Trapezoid shaped polygon 49 is defined by vertices 23° N–66° E, 23° S–66° E, 20° N–90° and 20° S–90° E.

Trapezoid shaped polygon 50 is defined by vertices 20° N–90° E, 20° S–90° E, 18° N–120° E and 18° S–120° E.

Trapezoid shaped polygon 51 is defined by vertices 18° N–120° E, 18° S–120° E, 18° N–150° E and 18° S–150 ° E.

Trapezoid shaped polygon 52 is defined by vertices 18° N–150° E, 18° S–150° E, 16° N–179° W and 16° S–145° W.

Trapezoid shaped polygon 41 is defined by vertices 18° N–179° W, 16° S–179° W, 14° N–145° W and 14° S–179° 1 W.

Trapezoid shaped polygon 42 is defined by vertices 14° N–145° W, 14° S–145° W, 17° N–110° W and 17° S–110° W.

Trapezoid shaped polygon 43 is defined by vertices 17° N–110° W, 17° S–110° W, 24° N–74° W and 24° S–74° W.

Trapezoid shaped polygon 44 is defined by vertices 24° N–74° W, 24° S–74° W, 24° N–42° W and 24° S–42° W.

Trapezoid shaped polygon 45 is defined by vertices by vertices 24° N–42° W, 24° S–42° W, 20° N–18° W and 20° S–18° W.

Trapezoid shaped polygons 46 and 47 extend over the African continent and, as noted above, are more irregular. Trapezoid shaped polygon 46 is defined by vertices 46(a)–46(d) located at respective points 20° N–180° W, 20° S–18° W, 3° N–7° E and 13° S–7° E. Trapezoid shaped polygon 47 is defined by vertices 46(c), 46(d), 47(a) located at 11° N–44° E and 47(b) located at 11° S–44° E.

The north/south edge common to trapezoid shaped polygon pairs 49,50 and 46,47 are cuts to allow the projection to lay flat. As shown in FIG. 3, those edges separate slightly so as to enable the projection to lay flat. Additional cuts are contemplated at the north-/south edges common to trapezoid shaped polygon pairs 42,43; 45,46; 48,49; and 52,41. These latter four cuts enable the flat Map illustrated in FIG. 3 to be separated into four individual panels for separate study of major land masses. A first band of twenty-two triangle-shaped facets 59 –80 connects the equatorial band of trapezoid shaped facets 41–52 to North polar facet 54. The first band of twenty-two triangle shaped facets 59–80 is arranged with an upper portion of eighteen triangle shaped facets 59–76 and a lower portion of triangle shaped facets 77–80 situated below facets 67–70 of the upper portion. The upper and lower portion are together considered a single band of triangle shaped facets. The upper portion of triangle shaped facets 59–76 is arranged in a two-up, one-down sequence except for facets 67–71 extending over the European land mass. Triangle shaped facets 67–71, as explained in more detail below, follow in an Easterly direction the pattern one-up, one-down and three-up.

The pattern of triangles 59–76 is established with intervals along or near the Tropic of Cancer reduced to an average of 30° for the twelve north pointing triangles 59, 61, 62, 64, 65, 67, 69–71, 73, 74 and 76 of the upper portion of eighteen triangle shaped facets 59–76 and of 60° for the six south pointing triangles 60, 63, 66, 68, 72, 75 of the upper portion of the eighteen triangle shaped facets 59–76. Triangle shaped facets 59–66 and 71–76 are defined by North Polar vertice 54(a)–(f) and the ten northerly vertices of trapezoids 41–45 and 49–52 in the manner illustrated in FIG. 3.

A more complex pattern is necessary over Europe, North Africa and the Arabian Peninsula for selecting vertices to define triangle shaped facets 67–70 and 77–80. As is evident from FIG. 3, this portion of the first band of triangle shaped facets 59–80 is two rows thick, facets 68–70 in the upper portion, facets 77–80 in the lower portion and facet 67 in both upper and lower portions.

Triangle shaped facet 67 is defined by selected vertices 46(a), 31 at approximately 37.5° N–10° E and 54(a), with a cut line extending from point 30 at approximately 34° N–17° W to vertex 31. Triangle shaped facet 67 is out into components 67(a) and 67(b) to allow the separation of Spain from North Africa at the Strait of Gibraltar. Component 67(b) of facet 67 together with three additional triangle shaped facets 77 –79 cover North Africa and one further triangle shaped facet 80 covers most of the Arabian Peninsula.

Triangle shaped facet 77 is defined by selected vertices 46(a), 46(d) and 31 at 37.5° N–10° E. Triangle shaped facet 78 is defined by selecting vertex 31, vertex 32 at 32° N–32° E and vertex 46(d). Triangle shaped facet 79 is defined by vertices 32, 46(d) and 47(b). Triangle shaped facet 80 is defined by vertex 33 at 23° N–66° E and vertices 47(b) and 32.

Triangle shaped facets 68–70 sit above triangle shaped facets 78–80. Triangle shaped facet 68 is defined by vertices 31, 54(a) and 54(b). Triangle shaped facet 69 is defined by vertices 31, 32 and 54(b). Triangle shaped facet 70 is defined by vertices 32, 33 and 54(b).

The African continent is separated from the Eurasian land mass by a series of straight cuts, two through the Mediterranean Sea, one through the Red Sea, and one through the Gulf of Aden ending at the vertex at 23° N–66° E, which is the northeast vertex of trapezoid shaped facet 48.

The Mediterranean is split by a cut which starts from position 30 located approximately at 34° N–17° W east of the Strait of Gibraltar and extends straight to vertex 31 at approximately 37.5° N–10° E, which cut divides facet 67 into northerly components 67(a) and southerly component 67(b); and thence to vertex 32 at 32° N–32° E. A cut is then made from vertex 32 through the Sinai Peninsula, roughly paralleling the Suez Canal, to vertex 47(b) at 11° N–44° E and thence straight to the Arabian Sea vertex 33 at 23° N–66° E.

Each of triangle shaped facets 59–80 is separated from its adjacent triangle shaped facet by a fold, and therefore forms a contiguous panel, except for facet pairs 66,67 and 76,59, which are separated by cuts. Additional cuts are made between triangle-trapezoid pairs 59,41; 61,42; 64,44; 65,45; 74,51 and 76,52. The first two separate North America from Antarctica and the Pacific Ocean; the others permit their respective panels to lay flat.

A second band of triangle shaped facets 81–98 connects the equatorial band of trapezoid shaped facets 41–52 to South polar facet 56. The second lower band of eighteen triangle shaped facets 81–98 is arranged in a two-down, one-up, two-down, one-up and so on arrangement. The pattern of triangles is established with intervals along or near the Tropic of Capricorn reduced to an average of 30° for the twelve south pointing triangles 81, 82, 84, 85, 87, 88, 90, 91, 93, 94, 96 and 97 and an average of 60° for the six north pointing triangles 83, 86, 89, 92, 95 and 98. Triangle shaped facets 81–98 are defined by South Polar facets 56(a)–(f) and the twelve southerly vertices of trapezoids 41–52 in the manner illustrated in FIG. 3. Triangle shaped facet pairs 81,82; 83,84; 87,88; 90,91; 93,94 and 98,81 are separated by cuts, as are the following triangle-trapezoid pairs 84,43; 87,45; 93,49; 94,50 and 97,52.

FIG. 3 maybe shown as a single one-piece flat map. However, it is preferably divided into conveniently sized individual panels for individual study of the various continents. Specifically, by cutting the edges between trapezoid pairs 42,43; 45,46; 48,49; and 52,41 the user is left with four panels. A first panel is comprised of six polygons and contains Antarctica. A second panel is comprised of fifteen polygons and part of North Polar polygon 54 and contains North America (including Greenland) and South America. A third panel is comprised of twelve polygons and component 67(b) of facet 67 and contains Africa. A fourth panel is comprised of nineteen polygons and the remaining parts of North polar facet 54 and component 67(a) of facet 67 and contains the Eurasian land mass and Australia.

In accordance with the invention as contained in the above described first embodiment, the amount of distortion of the principal features is kept to a practical minimum. In this case it is limited to the distortion naturally resulting when projecting the Earth globe onto a flat surface. Distortion in this embodiment is at a practical minimum because it would not be materially reduced by the introduction of additional panels.

The polyhedral map in this first embodiment and its component flat map segments may be made of many different materials or combinations thereof, such as paperboard, laminates, plastic sheets, injection molded plastic, or various other materials and with a variety of hinging and joining means for assembly.

Assembly of the flat map segments illustrated in FIG. 3 into the entire polyhedral approximation of an Earth globe shown in FIGS. 1 and 2 is preferably done by first folding each flat map separately along each fold until all of the internal cut edges have been joined by applying slight pressure while aligning the respective edges, thereby forming portions of the polyhedron. The various polygonal portions may then be joined to one another by any number of connecting methods. The cut edges may be attached by simple interlocking tabs or hinges, by a hook-and-pile type joining material such as Velcro, by inset magnets wherein a cylindrical shaped magnet is fitted into the opening of a corresponding donut shaped magnet, or by any other joining method that will allow the edges to be joined along the various cuts made in the map.

FIGS. 4, 5, 6 and 7(a)-(n) illustrate a second embodiment of the invention and a modification thereof. The second embodiment is particularly suitable for projecting the features of an Earth globe onto flat surfaces and for generating a polyhedral approximation of an Earth globe.

Figure 4:
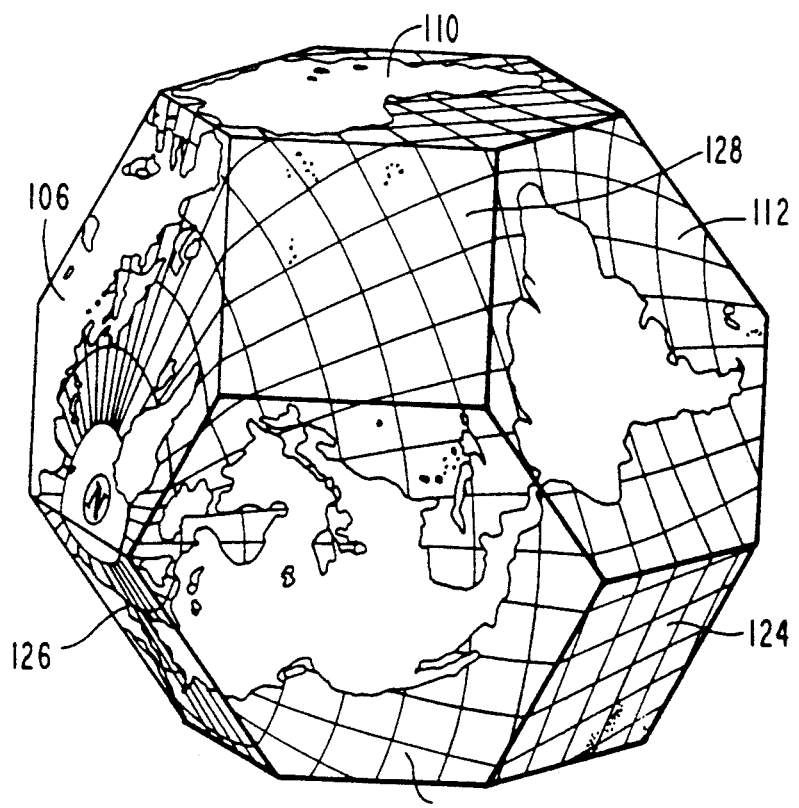
FIG. 4 is a perspective view of a second embodiment of the invention as applied to an Earth globe.
Figure 5:
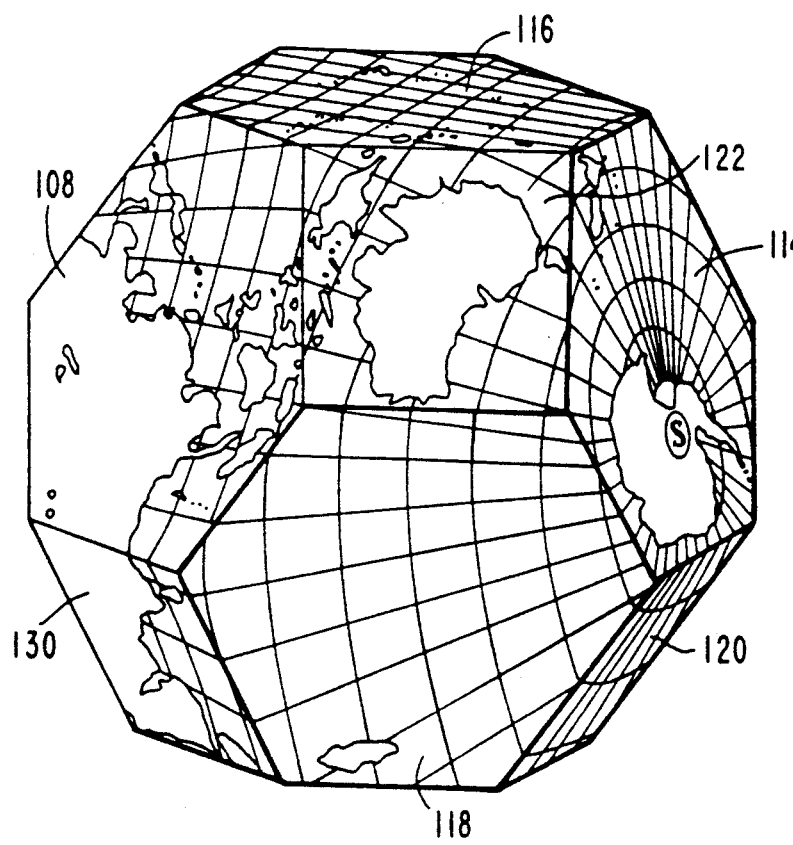
FIG. 5 is a perspective view of the second embodiment of the invention as shown in FIG. 4 but from a different angle.
Figure 6:
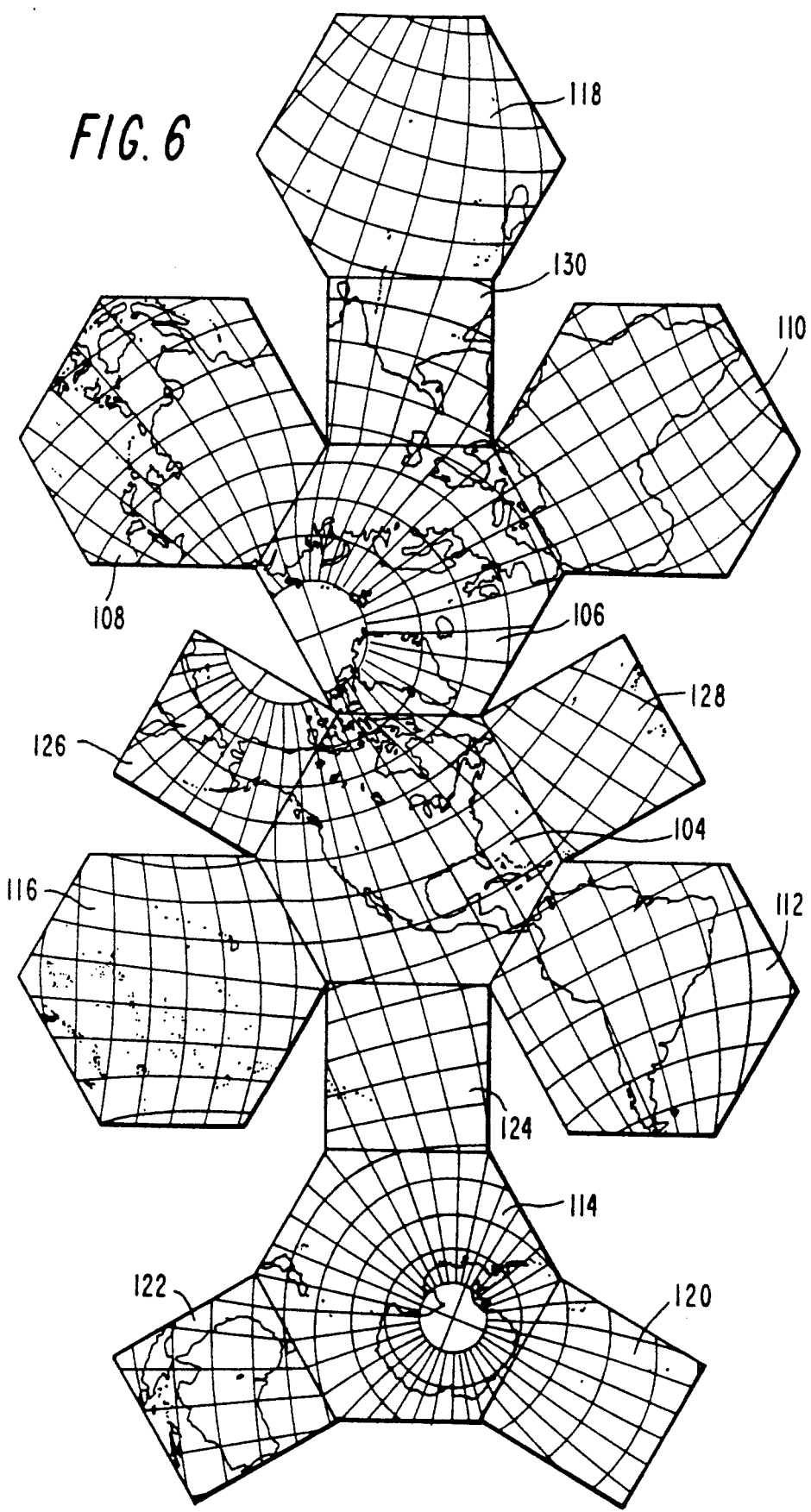
FIG. 6 is a layout of flat panels of the second embodiment of the invention.

FIGS. 4 and 5 illustrate perspective views of the second embodiment of the invention in its three dimensional form and FIG. 6 illustrates the second embodiment in its two-dimensional form wherein the features of the Earth globe depicted in FIGS. 4 and 5 are projected onto a single flat lay-out which, as explained later, may be broken into individual panels for viewing of major continental land masses.

In its three-dimensional form, the second embodiment of the invention is a fourteen-sided polyhedron. With reference to FIGS. 4-6, it consists of six quadrilateral panels 120, 122, 124, 126, 128 and 130 and eight irregular hexagon shaped panels 104, 106, 108, 110, 112, 114, 116 and 118. Each quadrilateral panel is square and, upon assembly into three-dimensional form, each square panel is centered between four hexagon panels. Each irregular hexagon panel has three shorter sides, and each of the shorter sides is opposite one of the three longer sides. The hexagons join squares along the longer sides of the hexagons and join each other along their respective shorter sides.

The vertices for each of the hexagons are selected in accordance with the method of the invention so as to place all or a majority of each continental land mass on its own separate flat panel and are thus located at the following approximate locations:

| North American hexagon 104: | | |
|---|---|---|
| 76° N-98° W, | 54° N-48° W, | 17° N-64° W, |
| 1° S-94° W, | 12° N-131° W, | 41° N-143° W |
| European hexagon 106: | | |
| 76° N-98° W, | 54° N-48° W, | 36° N-8° W, |
| 32° N-32° E, | 45° N-81° E, | 74° N-114° E |
| China/Southeast Asian hexagon 108: | | |
| 45° N-81° E, | 74° N-114° E, | 38° N-163° E, |
| 4° N-143° E, | 12° S-109° E, | 5° N-83° E |
| African hexagon 110: | | |
| 36° N-8° W, | 32° N-32° E, | 2° S-53° E, |
| 34° S-34° E, | 28° S-19° W, | 1° S-28° W |
| South American hexagon 112: | | |
| 1° S-28° W, | 28° S-19° W, | 60° S-40° W, |
| 42° S-100° W, | 1° S-94° W, | 17° N-64° W |
| New Zealand/Antarctic hexagon 114: | | |
| 30° S-170° E, | 34° S-148° W, | 42° S-100° W, |
| 60° S-40° W, | 64° S-51° E, | 52° S-122° E |
| Central Pacific hexagon 116: | | |
| 4° N-143° E, | 38° N-163° E, | 41° N-143° W, |
| 12° N-131° W, | 34° S-148° W, | 30° S-170° E |
| Indian Ocean hexagon 118: | | |
| 5° N-83° E, | 12° S-109° E, | 52° S-122° E, |
| 64° S-51° E, | 34° S-34° E, | 2° S-53° E |

Once the above vertices on the surface of the Earth globe have been selected to define the eight hexagon-shaped facets of the polyhedron, it will be seen that the remaining gaps between hexagons define precisely the remaining six square facets 120, 122, 124, 126, 128, 130.

As noted above, FIG. 6 shows the second embodiment in its two-dimensional form on a single sheet of paper. However, it is to be understood that each of the fourteen panels may be separated for individual study by cuts and then later assembled by any suitable connecting means, including those described above with respect to the first embodiment, into the polyhedral approximation of an Earth globe as depicted in FIGS. 4 and 5.

This second embodiment of the invention as illustrated in FIGS. 4, 5, 6 and 7(a)-(n) introduces slight, cartographically acceptable distortions of the matrix of parallel of latitude and meridians of longitude in order to shift portions of principal features, which otherwise would overlap onto adjacent facets, onto the primary facet containing the major portion of a respective principal feature. By this modification of the method of the invention, portions of North America (Newfoundland), Africa (the Mediterranean coast), Asia (Siberia at the Arctic Ocean), and Antarctica have each been caused to come to reside on their respective irregular hexagon shaped panels. Although distortion in this embodiment is slightly greater than the distortion naturally occurring as a result of projecting from a sphere to a flat surface, it is the smallest amount of distortion that also allows principal features to be located on individual facets, thereby maintaining a practical minimum of distortion.

With the fourteen-sided polyhedral approximation of an Earth globe represented by the second embodiment, even after incorporating the above described practical minimum of distortion, it is not always possible to select vertices to include each entire continental land mass on a separate panel for individual study. For example, North American hexagon 104 is not large enough to include Alaska, African hexagon 110 is not large enough to include all of Africa, and so on.

Figure 7B:
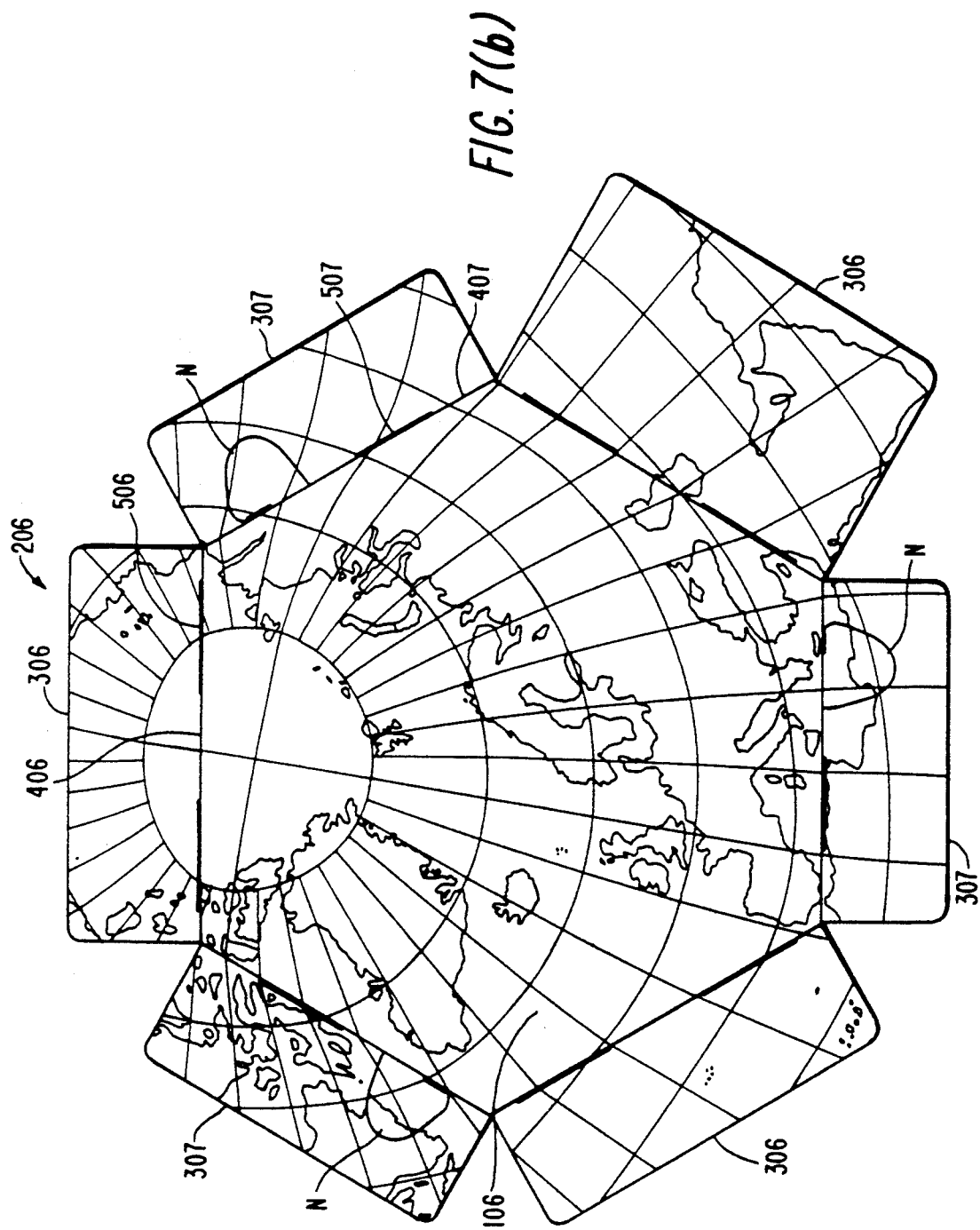
FIGS. 7(A)-7(N) show each of the individual panels of a modification of the second embodiment as shown in FIGS. 4 and 5.
Figure 7E:
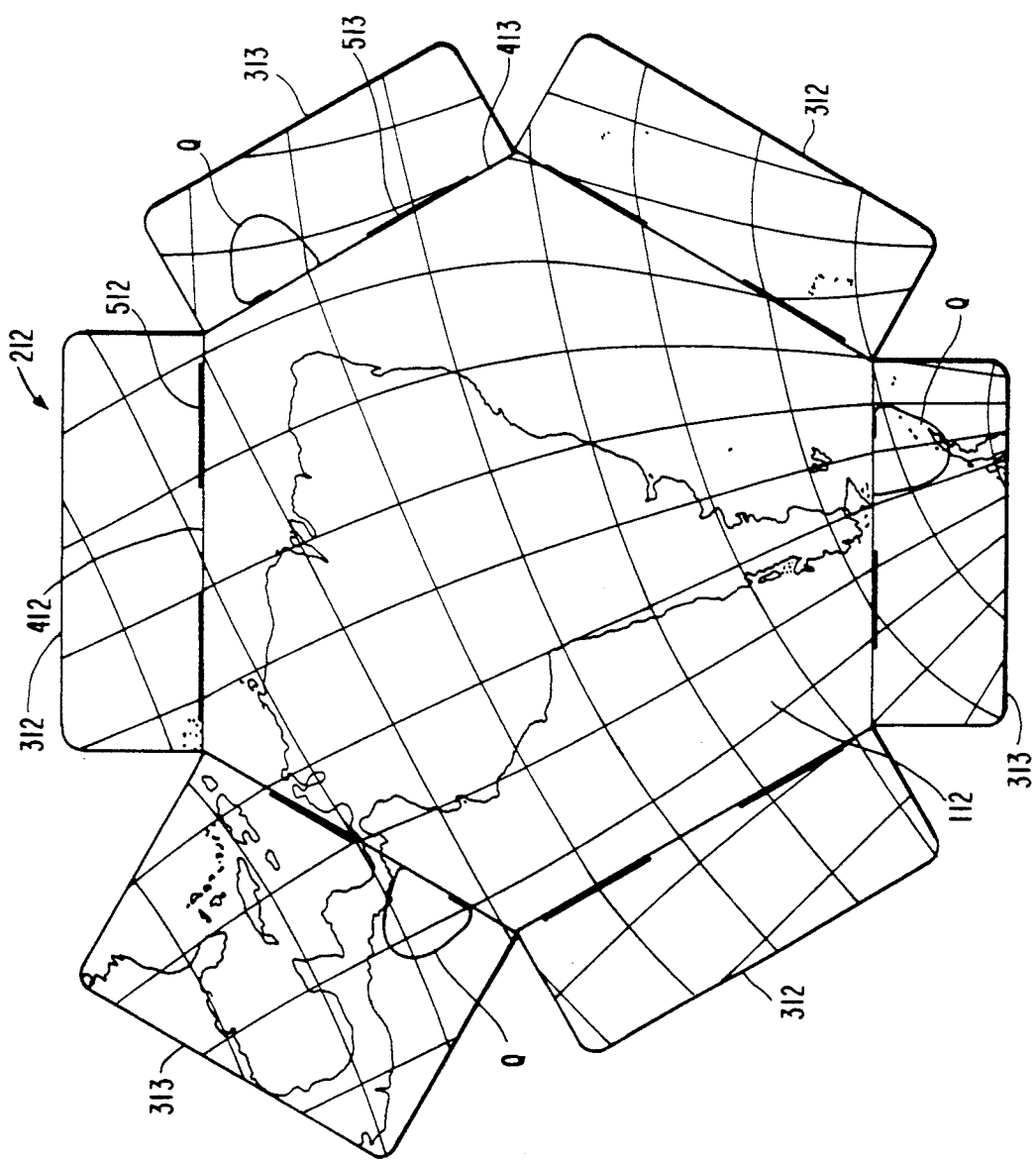
Figure 7I:
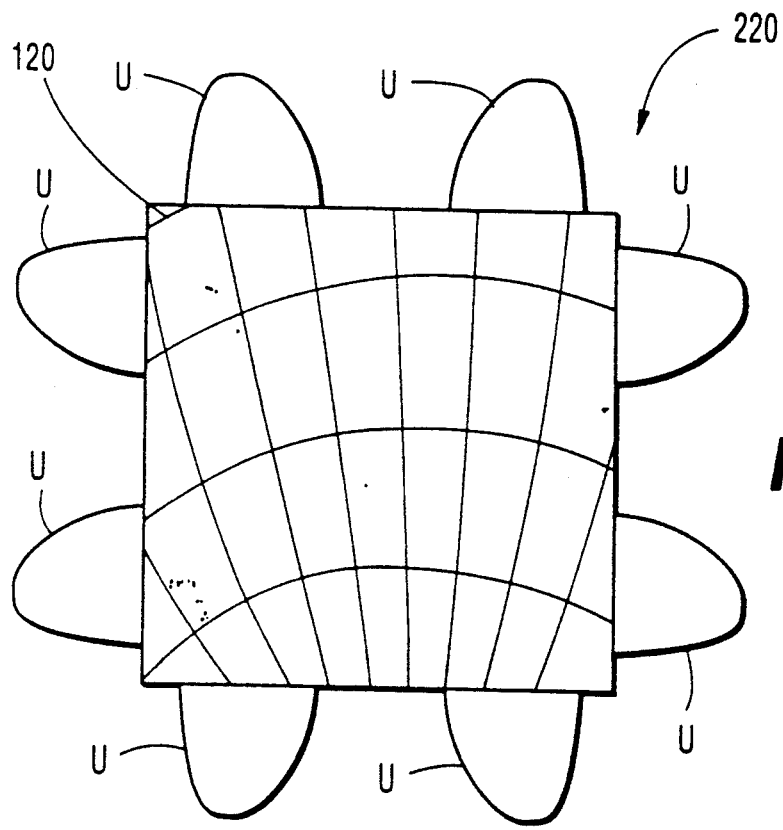
Figure 7J:
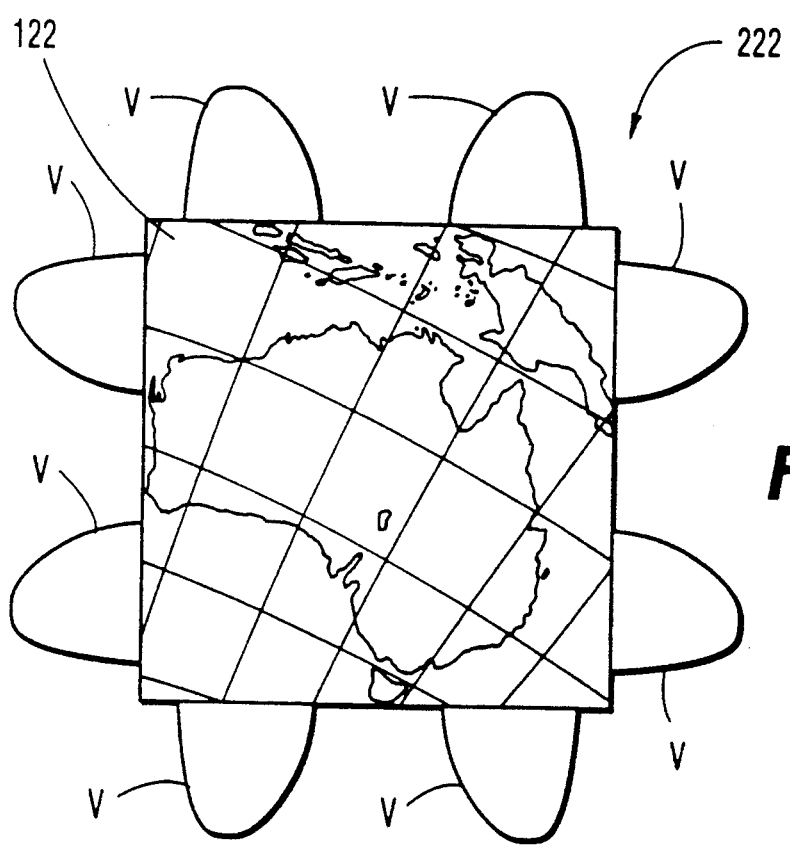
Figure 7K:
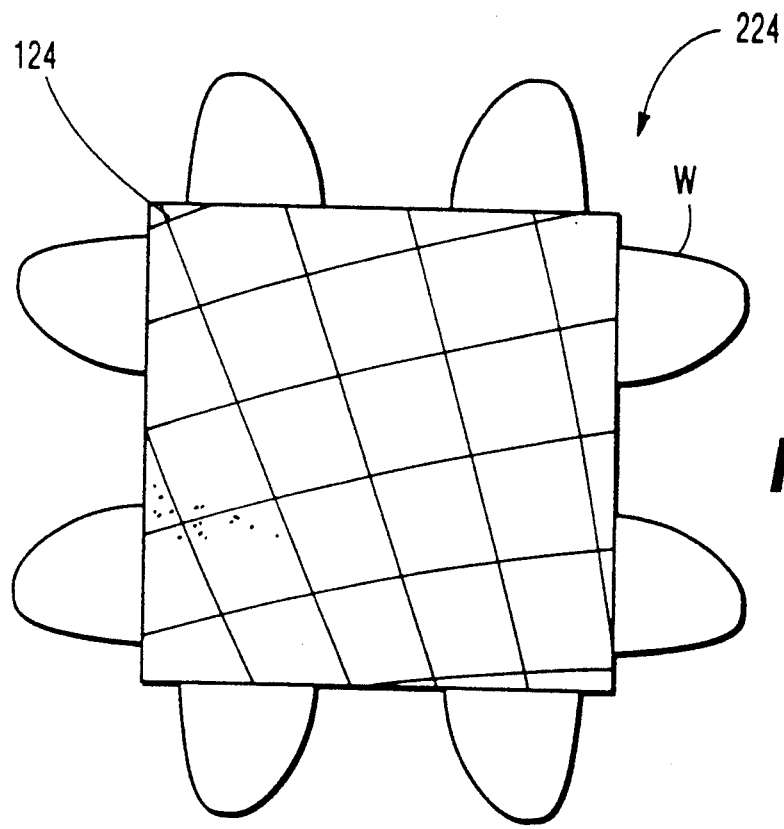
Figure 7L:
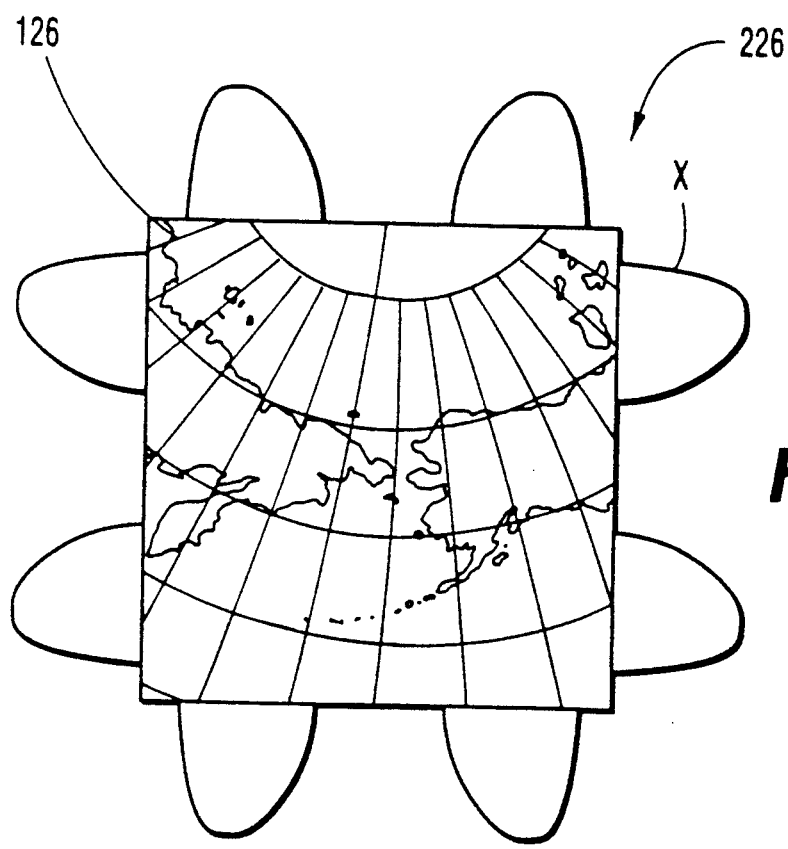
Figure 7M:
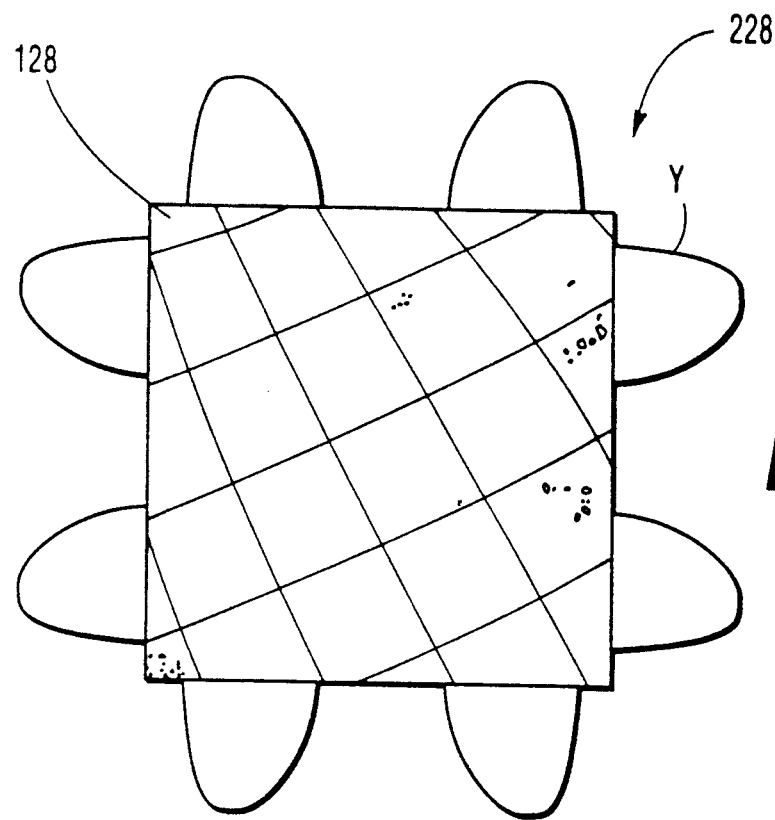
Figure 7N:
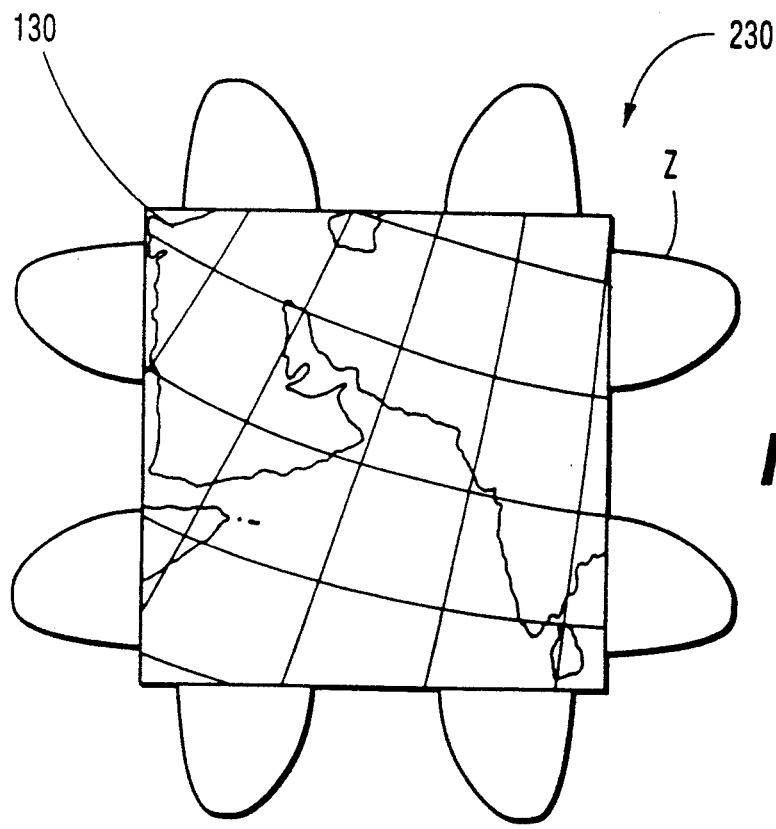

FIGS. 7(a)-7(n) illustrate a modification of the second embodiment of the invention that enables all of the complete land masses to be included on individual panels. Features common to those in FIGS. 4–6 are referred to in FIGS. 7(a)–7(n) by the same reference numerals.

In the modified second embodiment the fourteen facets of the polyhedral approximation of the Earth globe remain the same as in the second embodiment and are generated by the same process. FIGS. 7(a)–7(h) depict panels 204, 206, 208, 210, 212, 214, 216 and 218 on which North America, Europe, China/South East Asia, Africa, South America, New Zealand/Antarctica, the Central Pacific and Indian Oceans are mapped, respectively. FIGS. 7(i)–7(n) depict panels 220, 222, 224, 226, 228 and 230 containing thereon the lapping of square facets 120, 122, 124, 126, 128 and 130, respectively.

In general, each panel includes one of the fourteen polygons of the second embodiment for assembly into the polyhedron. The hexagon shaped polygons have tab portions extending from each edge. All panels have tongues extending from the polygon edges for engaging slots on the adjacent polygon during assembly.

FIG. 7(a) illustrates North American hexagon panel 204 which constitutes a main portion 104, three long side tab portions 304 and three short side tab portions 305. The main portion 104 of panel 204 bears the same reference numeral and corresponds to hexagon 104 in the second embodiment. The main portion 104 is separated from tab portions 304 and 305 by fold lines 404 and 405, respectively. The three tab portions 305 contain on fold lines 405 one or more tongues M and an equal number of slots 505 of sizes corresponding to similar tongues and slots for connection of panel 204 to its three adjoining hexagonal panels. Fold lines 404 each contain within it one or more slots of a size needed for insertion of the tongue or tongues from the adjacent square panel.

The tab portions generally are substantially rectangular with rounded corners. The tongue and slot combination serves as a connecting means for attaching the facets for assembly into a polyhedral approximation of a globe as described above. The tab portions, which may vary in their dimension measured perpendicularly from their respective fold lines also depict thereon features of the Earth globe being mapped that normally extend beyond the edge of the main portions, thereby enabling the user to study an entire major land mass from a single panel.

A detailed explanation of the use of tab portions in the invention will now be given with respect to panel 204 and which explanation is readily applicable to the remaining hexagon shaped panels 206, 208, 210, 212, 214, 216 and 218. The North America polygon 104 is illustrated as main portion 104 of panel 204 in FIG. 7(a). It can be seen, however, that portions of Northern Canada, Alaska and Hawaii are not contained on main portion 104 and, therefore, if only polygon 104 is used, the entire North American continent cannot be studied together by the student on a single panel. In this case the three tab portions 304 and three tab portions 305 extend the mapped area of single panel 204 to include virtually all of Northern Canada, Alaska and Hawaii.

When panel 204 is assembled with the remaining panels into a polyhedral approximation of a globe, tab portions 304,305 are folded at folds 404,405, respectively, and the respective tongues and slots engage. The tab portions 304,305 will rest beneath the adjacent facet and are no longer visible to the user. However, the projected mapping information contained on those tab portions is duplicative of the features illustrated on main portions of adjacent panels under which the tab portions have slid. Thus, for example, the state of Alaska depicted on one of longer tab portions 304, of North American panel 204 is duplicated on main portion 126 of panel 226, as illustrated particularly in FIGS. 4 and 7(l).

FIG. 7(b) illustrates panel 206 containing European hexagon-shaped facet 106. Tab portions 306 and 307 are each separated from hexagon 106 by folds 406 and 407, respectively. Tab portion 307 contains on fold lines 407 tongues N and each of tab portions 306 and 307 contains one or more slots for accommodating the tongue of an adjacent panel upon assembly into a polyhedral approximation of a globe.

FIG. 7(c) illustrates panel 208 containing China/Southeast Asian hexagon 108. Tab portions 308 and 309 are each separated from hexagon 108 by folds 408 and 409, respectively. Tab portions 309 contain on fold lines 409 tongues 0 and each of tab portions 308 and 309 contains one or more slots accommodating the tongues from adjacent panels upon assembly into a polyhedral approximation of a globe. Tab portions 308 and 309 on panel 208 are used to extend the viewing area of China/Southeast Asian hexagon 108 to include all of India, China, Siberia and a majority of the Southeast Asian Islands.

FIG. 7(d) illustrates panel 210 containing African hexagon 110. Tab portions 310 and 311 are each separated from hexagon 110 by folds 410 and 411, respectively. Tab portions 311 contain on fold lines 411 tongues P and each of tab portions 310 and 311 contains one or more slots for accommodating tongues of adjacent panels upon assembly into a polyhedral approximation of a globe. Tab portion 310 in the upper right of FIG. 7(d) depicts those portions of the African continent not contained on the main portion 110 of panel 210, thereby enabling the user to study the entire continent of Africa on a single panel.

FIG. 7(e) illustrates panel 212 containing South American hexagon 112. Tab portions 312 and 313 are each separated from hexagon 112 by folds 412 and 413, respectively. Tab portions 313 contain on fold lines 413 tongues Q and each of tab portions 312 and 313 contain one or more slots for accommodating tongues of adjacent panels upon assembly into a polyhedral approximation of a globe.

FIG. 7(f) illustrates panel 214 containing New Zealand/Antarctica hexagon 114. Tab portions 314 and 315 are each separated by folds 414 and 415, respectively. Tab portions 315 contain on fold lines 415 tongues R and each of table portions 414 and 415 contains one or more slots for accommodating tongues from adjacent panels upon assembly into a polyhedral approximation of a globe. With respect to panel 214, a minor distortion has been introduced to allow Antarctica and New Zealand to be displayed on the same panel.

FIGS. 7(g) and (h) illustrate panels 216 and 218 containing central Pacific hexagon 116 and Indian Ocean hexagon 118, respectively. Tab portions 316 and 317 on panel 216 are separated by folds 416 and 417, respectively, and tab portions 318 and 319 on panel 218 are separated by folds 418 and 419, respectively. The shorter tab portions 317 on panel 216 contain on folds 417 tongues S and each of tab portions 316 and 317 contains one or more slots for accommodating tongues of adjacent panels. Similarly, the shorter tab portions 319 on panel 218 contain on folds 419 tongues T and each of tab portions 318 and 319 contains one or more slots for accommodating tongues of adjacent panels upon assembly into a polyhedral approximation of a globe.

FIGS. 7(i)-7(n) illustrate panels 220, 222, 224, 226, 228, 230 containing square facets 120, 122, 124, 126, 128 and 130, respectively. Main portions 120, 122, 124, 126, 128 and 130 have extending therefrom tongues U,V,W,X,Y,Z, respectively. Each of the six square panels in this embodiment contains eight tongues, two protruding from each of the square's four edges. The tongues on the six square panels serve primarily as connecting means for attaching those panels to the four adjacent hexagonal panels when assembling the fourteen panels into a polyhedral approximation of a globe. Since all of the major land masses, except for Australia which appears in its entirety on panel 22, as illustrated in FIG. 7(j), are on hexagon shaped panels, it is not necessary for the square panels to contain tab portions, although such is not precluded. Thus, a student wishing to study all of the principal features of the Earth may do so with this modified second embodiment from panels 204, 206, 208, 210, 212, 214 and the single square panel 222.

The second embodiment, thus modified, is preferably manufactured of plasticized paperboard, and the joining method as illustrated in FIGS. 7(a)-7(n) are sets of slots and tongues each located on the fold lines at the edges of the facets. Of course, other suitable means of connecting individual facets are also contemplated.

The polyhedral approximation of an Earth globe of the second embodiment is assembled by first connecting the shorter edges of each of the eight irregular hexagon panels 204, 206, 208, 210, 212, 214, 216, 218 to adjacent hexagons by sliding opposing tongues M, N, O, P, Q, R, S, T into their respective slots in the fold lines of the adjoining hexagons, followed by a lateral sliding motion that locates the edges accurately and locks them into the correct relationship. Six square openings will remain and these are then fitted with the six square facets 220, 222, 224, 226, 228, 230, each of which has one or more projecting tongues on each edge, two per edge being illustrated in 7(i) to 7(n). The design of the slots and tongues on these edges is such that the tongues, when fully inserted, tend to spring outward and thus add stiffness and stability to the completed structure, the square facets being locked into place by the same springing-out motion of the tongues.

The fourteen faceted polyhedral approximation of an Earth globe may also be assembled and used in a knock-down pop-up form. In this case the assembled polyhedron has an external appearance the same as that described above with regard to the second embodiment. However, the facets are interconnected by a resilient connecting and hinging means, such as an elastic band material or the like, thereby allowing the polyhedron to collapse into a two-sided two dimensional form by application of downward pressure. In its two dimensional form, seven of the polygons will face upward and seven will face downward.

Figure 8:
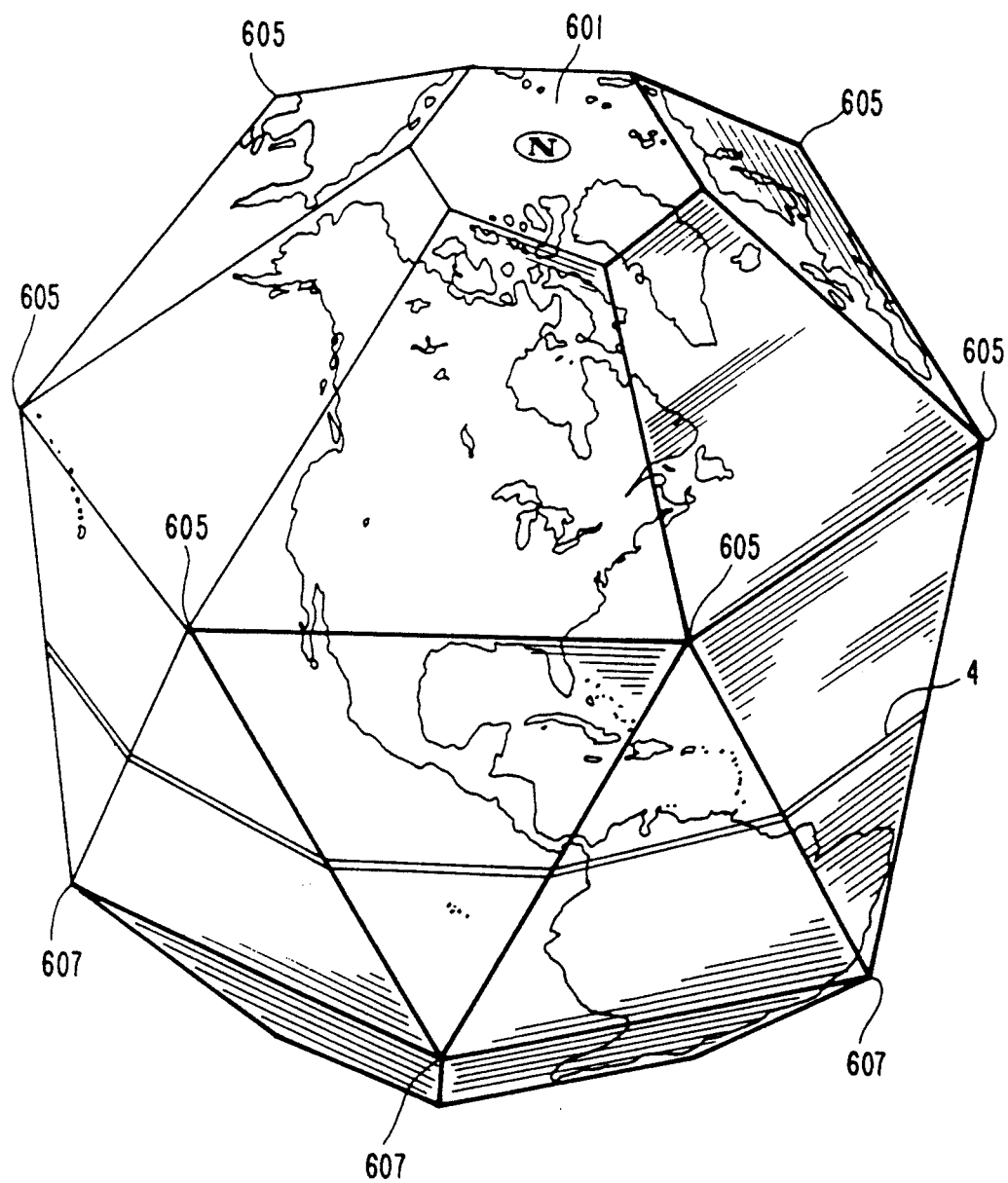
FIG. 8 is a perspective view of a third embodiment of the invention.

FIG. 8 illustrates a perspective view of a third embodiment of the invention in its three-dimensional form. The third embodiment is a modified version of the first embodiment reducing the number of facets of the first embodiment to approximately 26, although, as explained below, other variations are also possible. A single six sided facet 601 is positioned at each pole on a plane perpendicular to Earth's axis located through the poles. A band of twelve triangles alternating upwardly and downwardly is positioned around equator 4. Northern vertices 605 and southern vertices 607 define the twelve triangles in the equatorial band. Northern vertices 605 are chosen so as to be located on the Tropic of Cancer or as close to it as possible and southern vertices 607 are chosen so as to lie on the Tropic of Capricorn. Northern vertices 605 are also located as close as possible to the same longitude as that of a corresponding vertex of North Polar six sided facet 601. Southern vertices 607 are located as close as possible to the same longitude as that of a corresponding vertex of the South Polar six sided facet.

Lines are then placed from northern vertices 605 of equatorial band of triangles to corresponding vertices on the North Polar facet 601, thereby creating six trapezoids in the northern temperature zone, which may or may not be symmetrical. Lines are also placed from southern vertices 607 of the equatorial triangle band to the corresponding vertices on the south polar facet 601, thereby creating six trapezoids in the south temperature zone. The trapezoids in the southern band tend to be symmetrical but are of different widths. The features on the surface of the globe are then projected from the areas defined by the vertices to facets forming the polyhedral approximation of a globe. The facets may then be transposed to a flat layout of one or more panels wherein the triangles in the Equatorial band are laid out in sequence with a trapezoid panel attached to the base of each triangle. The north-south edges of the trapezoids may be either folds or cuts. As with the first embodiment, the North Polar facet 601 may be cut in half. However, as illustrated in FIG. 8 the North Polar facet 601 is left whole, being folded and attached to Greenland and cut along its other five edges.

With the 26 facet version of the third embodiment, vertices are selected by first extending a line from Novaya Zemlya, U.S.S.R., along the Ural Mountains southward to the Arabian Sea to serve as a north/south trapezoid line. A second line which serves as a north/south triangle line is drawn northward from the Mozambique Channel, between Africa and Madagascar, and passing as closely as possible to the Arabian Peninsula, the intersection of the two being a vertex at approximately 22° N-60° E. This second line passes closely to Africa and intersects the Tropic of Capricorn at approximately 23.7° S-38° E, which will serve as a vertex.

The line through the Ural Mountains may be fold or a cut; the line between Africa and Madagascar is a cut.

Preceding westerly, the next north/south trapezoid line passes between Iceland and Great Britain, and will fall along the 12th meridian west. This is a cut line. Its southern vertex is forced above the Tropic of Cancer to about 32° N by the need to run a southerly line of the triangle passing Africa and ending near Rio de Janeiro. This line, running from a vertex at 32° N-12° W to a vertex at 23.7° S-40° W is also a cut.

The northern vertex off Morocco, at 32° N-12° W, and the southern vertex off Mozambique, at 23.7° S-38° E, define a north/south triangle fold line diagonally across Africa The Morocco vertex at 32° N-12° W and the Arabian Sea vertex at 22° N-60° E define another fold line which extends across North Africa and forms the base of a northern trapezoid and the base of a south pointing triangle. The vertex off Mozambique at 23.7° S-38° E and the vertex near Rio de Janeiro at 23.7° S-40° W define a fold line, which extends across southern Africa and the South Atlantic Ocean and forms a south hemisphere trapezoid top and a base of a north pointing triangle.

A fold line heads northwest from the Rio de Janeiro vertex at 23.7° S–40° W, passing to the east of the West Indies and terminating at 32° N–67° W, near Bermuda. The east/west line from the Bermuda vertex at 32° N–67° W across the North Atlantic to the vertex off Morocco at 32° N–12° W is a cut. The line extending northward from the Bermuda vertex to Baffin Bay is a trapezoid fold line. A line also extends from the Bermuda vertex between Cuba and Haiti, across the isthmus of Panama, and terminates well off the coast of Peru at approximately 23.7° S–94° W. This line may be a fold or cut depending on whether the North and South American continents are to be shown on separate Map segments. The east/west line from the Peru vertex at 23.7° S–94° W to the Rio de Janeiro vertex at 23.7° S–40° W is a fold across South America.

The Baja California vertex is at 23.7° N–128° W. The line from Baja California vertex to the vertex off the Peruvia coast at 23.7° S–94° W is a cut. The line from the Bermuda vertex at 32° N–67° W to the Baja California vertex at 23.7° N–128° W, is a fold across North America. There is also a fold line north from this vertex, ending in the Beaufort Sea.

The succeeding line goes from the Baja California vertex at 23.7° N–128° W southwest to the south central Pacific vertex at 23.7° S–146° W and is a cut. There is a fold line from the Peruvian vertex at 23.7° S–94° W to this South Central Pacific vertex. From the South Central Pacific vertex the next line lies to the northwest, terminating west of Hawaii at 23.7° N–169° W. It is also a cut line. A fold line extends to the Hawaii vertex at 23.7° N–169° W from the Baja California vertex at 23.7° N–128° W. The line to the north from the Hawaii vertex passes between Alaska and Siberia and terminates in the Siberian Sea and is a cut line.

From the Hawaii vertex at 23.7° N–169° W a cut line extends southwest to terminate at the Australia vertex at 23.7° S–162° E. The line to this Australian vertex from the South Central Pacific vertex at 23.7° S–146° W is a fold line passing to the north of New Zealand.

A fold line also extends from the Australia vertex at 23.7° S–162° E, passing between the islands of New Guinea and New Britain and terminating at the Taiwan vertex at 23.7° N–123° E. A cut line extends from the Hawaii vertex at 23.7° N–169° W to the Taiwan vertex and the line heading north from Taiwan vertex ending in the Laptev Sea, is a fold line. Also, from the Taiwan vertex, a cut line passes west of the Philippines and between the islands of Java and Sumatra, and terminates at the Indian Ocean vertex at approximately 23.7° S–96° E. A fold line crosses Australia from 23.7° S–162° E to the Indian Ocean vertex. From the Indian Ocean vertex a cut line extends across the Indian Ocean, terminating at the initially defined vertex near the Arabian Peninsula at 22° N–60° E. The line from the Indian Ocean vertex at 23.7° S–96° E westward, toward the Mozambique-Madagascar vertex at 23.7° S–38° E, is a fold line across the southern Indian Ocean. The line from the Taiwan vertex at 23.7° N–123° E to the Arabian Sea vertex at 22° N–60° E is a fold line across India and Southeast Asia.

All the lines southward from vertices on the Tropic of Capricorn extend in a true southerly direction and terminate on the 62nd southern parallel, the intersection of each line with the 62nd southern parallel forming a vertex of the South Polar facet. These lines may be cuts or folds depending on the chosen arrangement. The South Polar segment may be alternatively connected to one or more trapezoid panels, or it may be left as a single interconnected panel.

The North Polar facet is more irregular than the South Polar facet because three of the vertices in the north temperate zone, those near Bermuda and Morocco and in the Arabian Sea, do not lie exactly on the Tropic of Cancer. The North Polar facet, whose vertices would ideally be situated about the 75th parallel, will thus be caused to extend outward some four degrees further at the vertices bracketing Greenland and to retract about one degree near Novaya Zemlya, U.S.S.R. All the edges of the North Polar facet are cuts except the edge across Greenland, which is a fold.

The resulting polyhedron has the desired 26 facets. In this embodiment the South Polar facet is a separate segment. North America, Central America, Greenland, Alaska and Hawaii are a Map segment made up of six facets. South America and the Eastern Caribbean are a Map segment of three facets. Africa and Europe together are on a segment of four facets. Madagascar and the Indian Ocean cover two facets. Japan, China, India and Asian Russia are a segment of three facets. Australia, New Guinea and Micronesia/Melanesia are a segment comprising three facets. New Zealand and Polynesia are on a two-facet Map segment. The last two facets are in the far reaches of the South Pacific.

As in the case of the first and second embodiments, the actual three-dimensional model of the map may be made of paperboard, laminates or various other materials and a variety of forming means may be used for assembly.

The third embodiment may also be modified to vary the number of facets. For example, if a 30 facet polyhedral is selected, a single seven-sided facet is positioned at each pole on a plane perpendicular to the Earth's axis and there is a band of fourteen triangles positioned around the equator alternating upward and downward. By connecting each vertex of the polar hexagons to its corresponding vertex on the band of triangles, as described above with respect to the 26 facet version, seven trapezoids are created in each hemisphere.

Figure 9:
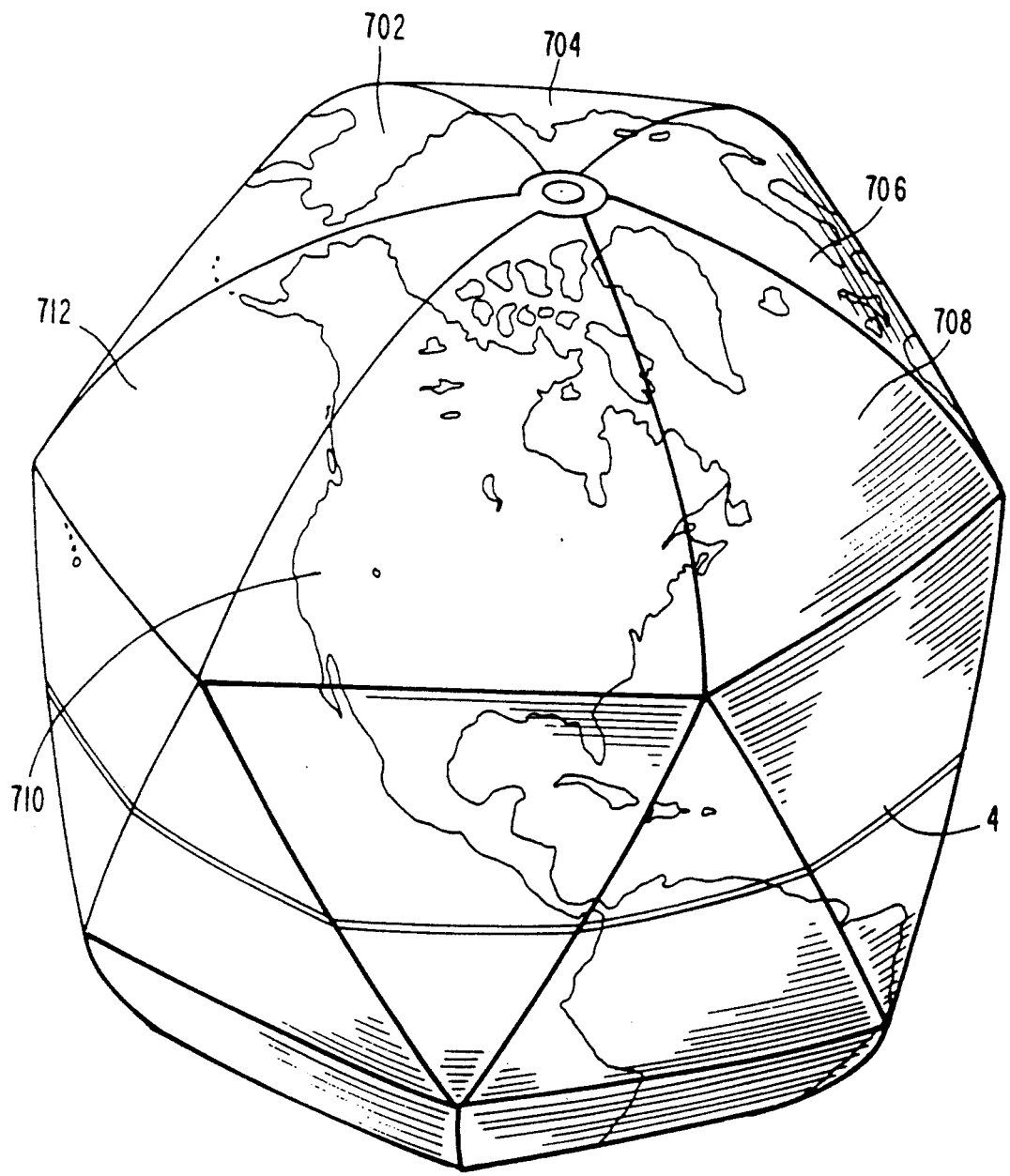
FIG. 9 is a perspective view of a fourth embodiment of the invention.

FIG. 9 illustrates a fourth embodiment of the invention as applied to an Earth globe. The polyhedral approximation of the Earth globe starts with the same band of triangles around the Equator as in the third embodiment and the vertices for those triangles are selected in the same manner as in the third embodiment. Rounded gores, however, replace the trapezoids and polar hexagons so as to give the finished Polyhedral Map a more rounded appearance when assembled.

The specific embodiment of FIG. 9 includes twelve equatorial triangles and twelve gores, six gores being in the Northern Hemisphere 702, 704, 706, 708, 710, 712 and six gores (not shown) in the Southern Hemisphere. Each gore corresponds to one of the triangles. The base of each gore will be the horizontal east/west base of one of the triangles, extending along a straight line in space between the eastern and western vertices of each triangle The base of each gore is a fold line between itself and its adjacent triangle The gores eliminate the need for polar facets as in the third embodiment by extending their north/south lines all the way to the respective poles.

The finished Map comprises 24 facets, half flat triangles and half curved gores. The resulting figure when projected to a flat map looks very much like the outside face of a segment of a peeled orange laid flat. When laid flat, each gore has sides that are nearly parallel at its widest point, and the curvature of the two sides increases steadily as one approaches the narrowest point at the ends.

To construct the Map, twelve up-down arranged triangles from the equatorial band are laid out on a flat surface. Only one cut is needed, thereby allowing all triangles to be joined in a single flat sheet. If the leftmost (westernmost) triangle is the one containing Polynesia, just to the southwest of Hawaii, the others from left to right may be called respectively the Hawaiian, Western Pacific, Central American, South American, North Atlantic, South Atlantic, African, Indian Ocean, Southeast Asian, Australian, and Micronesian triangles.

The next step is to attach the twelve gores to their respective triangles. Each gore has a slightly different shape determined by the length and angle of the line between gore and triangle. The line between each gore and its corresponding triangle is preferably a fold line.

When the three dimensional Map is assembled, the twelve triangles will form flat facets about the Equator, exactly as in the third embodiment. Each gore will be flat in the east/west direction, but will follow a smooth north/south curve to the nearest pole. The joined edges of the gores form arcs of perfect circles passing through the poles, thereby giving the map a more rounded appearance.

Every north/south line between gores is a cut line, and a number of those cut lines then must pass through land. However, in accordance with this embodiment, the number of cut lines that pass through principal land features is kept to a minimum. In the Northern Hemisphere, there is a cut to the northwest of Hawaii passing between Alaska and Siberia, which avoids passing through a land mass. The next two cuts miss the contiguous 48 United States and Alaska, but pass through eastern and western portions of Canada. The fourth cut passes between Iceland and Great Britain, also avoiding land masses. The fifth follows a north/south line of the Ural Mountains, an approximate dividing line between Europe and Asia. The final northern cut passes through portions of eastern China and Siberia.

As an alternative, the tips of the six Southern Hemisphere gores may be clipped, thereby allowing the Antarctic continent to lie on a single flat map facet.

In its two-dimensional form, it is preferable for the purposes of individual study to divide the flat Map into at least four flat map segments, each with three triangles and three adjacent gores. Central and South America fall on three of the triangles, forcing the first choice together with their respective gores. The next segment to the east would include Africa, Madagascar and Europe. This is followed by a segment including Asia, Australia, Japan and the western Pacific. The final remaining segment would include New Zealand, Hawaii, Alaska, and the eastern Pacific. Other arrangements are contemplated, but this one has the virtue of possessing a certain pleasing symmetry.

The assembly of the fourth embodiment from four flat segments into its three-dimensional form is most easily done by first joining the four sections of the equatorial band of triangles. One means to effect this attachment is by the placement of four small magnetic latches at each edge to be joined, with alternating male and female parts at the respective edges of each pair of joined pieces. Each such edge has two male parts, each consisting of a projecting tab with an attached tiny cylindrical magnet on its inner side, alternating with two female parts, each consisting of a hole in the body of the respective facet with an annular magnet placed on the inner side of the facet, the holes in the annular magnets coinciding with those in the facet. When a male part is positioned above a female part, the magnets being properly magnetized, the cylindrical magnet is drawn into the hole in the annular magnet, thus positioning and locking the edges of the two facets together and forming a hinge to permit the folding motions necessary for further assembly of the map.

The gores are fabricated with small intermittent tabs along their curved edges. When the edges of two adjacent gores are joined, the tabs pass between one another and beneath the opposite gore. Each gore is provided with a circular tab at its extreme tip, each such tab being perforated at a position corresponding to the respective pole. The gores, being assembled in a given hemisphere in any desired order, may have a clip or other fastener passed through the holes in their tips, or a stand with a projecting rod may be provided, such that either the clips or the rod secure the tips of the gores in their correct assembled position, the springiness of the gores being sufficient to maintain their edges in the intended alignments.

Construction materials and means of assembly of the fourth embodiment are governed by the need for the gore facets to curve through space when assembled, yet spring back to their flat configuration upon disassembly. The triangles in the equatorial band may be made of stiffer composite materials similar to that used in the first embodiment. It is preferable, however, to use the same material throughout, and the preferred choice in this embodiment is plasticized paperboard.

The above attachment and construction methods are also applicable to each of the first, second and third embodiments.

Figure 10:
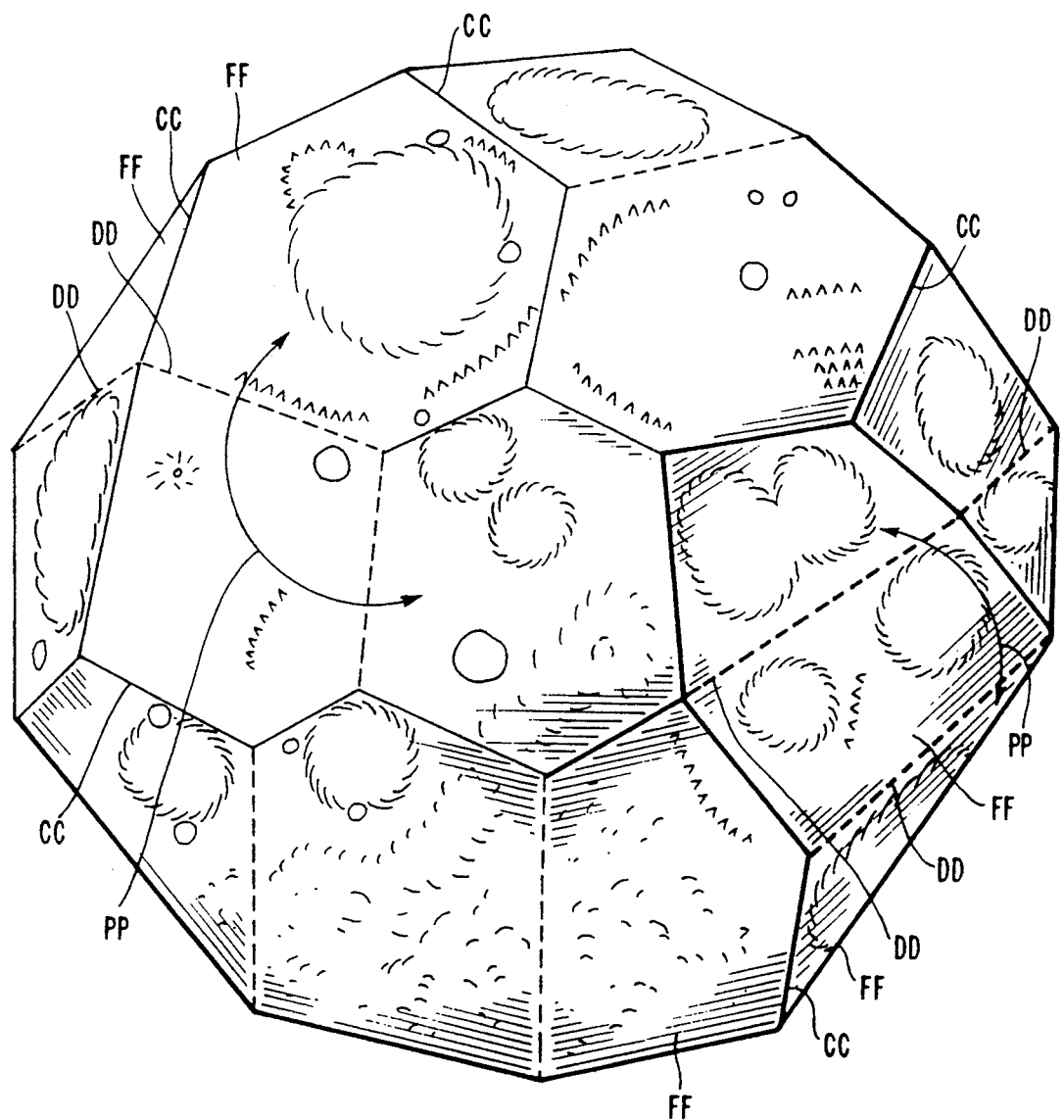
FIG. 10 is a perspective view of an embodiment of the invention as applied to a map of Earth's moon.

FIG. 10 is a perspective view of an embodiment of the invention as applied to a map of Earth's Moon, in which the principal features to be mapped are the major craters and mountain ranges of the Moon. This view of the Moon is typical of the remainder of the map, the principal features being arranged in groups corresponding to polygonal facets FF, the vertices of which are so located as to facilitate their further grouping into conveniently sized panels PP, each containing one or more facets. The cuts CC identified as solid lines and folds DD identified as dashed lines on the map are made to allow the various panels to be disassembled into flat or flattenable panels for use and study. The attachment and construction methods described above are generally applicable to this embodiment as well. On FIG. 10 only a representative number of facets, panels, cut lines and fold lines have been labeled with reference letters so as to maintain clarity of the figure. Other arrangements are of course possible, and final choices of facet and panel shapes and other mapping details are within the skill of the ordinary cartographer or lunographer.

Figure 11:
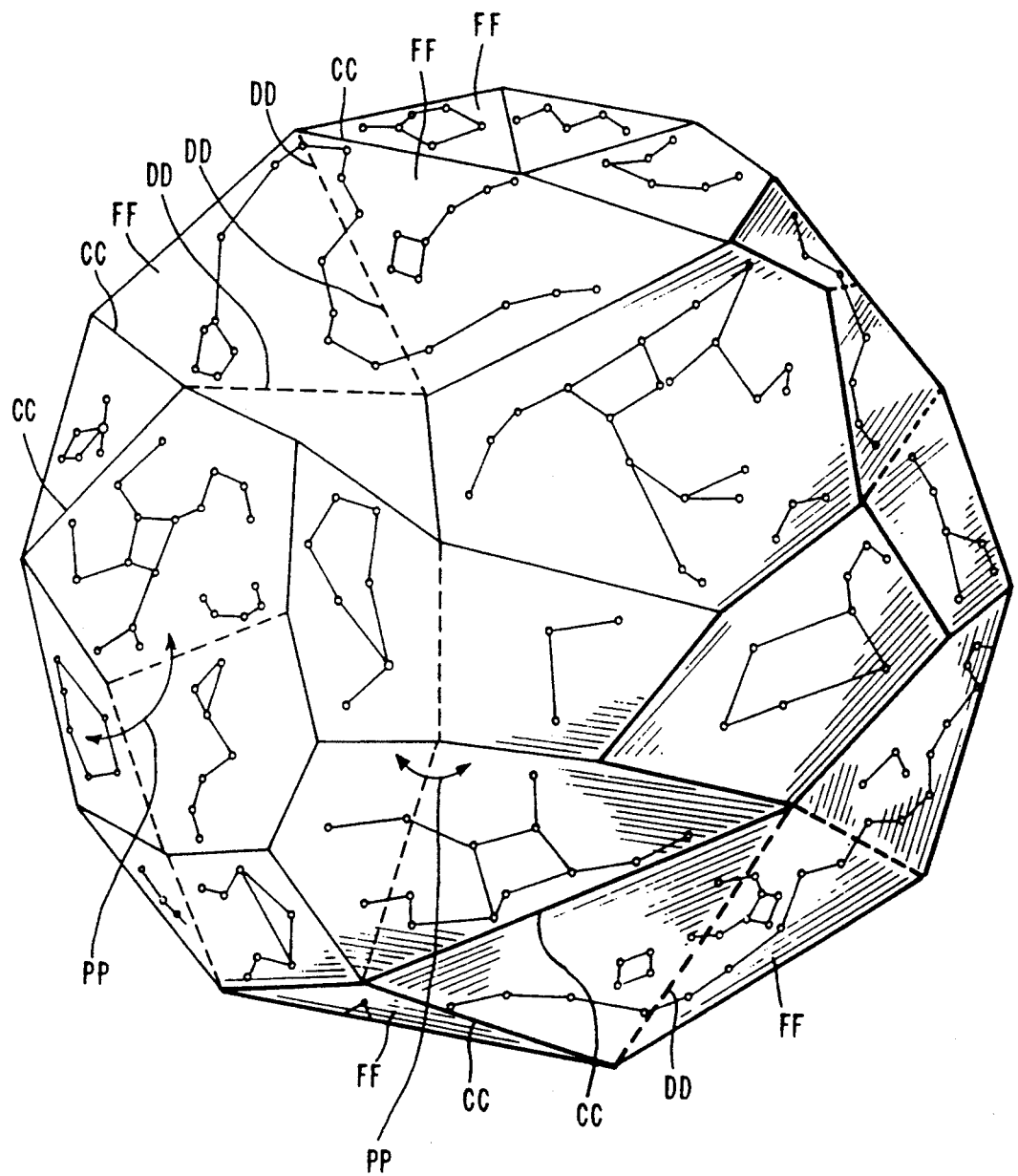
FIG. 11 is a perspective view of an embodiment of the invention as applied to a map of the constellations as seen from the Earth.

FIG. 11 is a perspective view of an embodiment of the invention as applied to a map of the stars as seen from the Earth, in which the principal features to be mapped are the eighty-eight constellations of stars as recognized by the International Astronomical Union. This perspective view of the map is centered at approximately 13.5 hours Right Ascension and +30° (North) Declination. This would represent the sky at about midnight in later April at 30° north latitude. It is typical of the remainder of the map, the principal features being arranged in groups corresponding to polygonal facets FF, the vertices of which are located so as to facilitate their further grouping into conveniently sized panels PP, each containing one or more facets. The cuts CC identified as solid lines and folds DD identified as dashed lines on the map are arranged to allow the various panels to be disassembled into flat or flattenable panels for use and study. The attachment and construction methods described above are generally applicable to this embodiment. On FIG. 11 only a representative number of facets, panels, cut lines and fold lines have been labeled with reference letters so as to maintain clarity of the figure.

As the invention is broadly applied to the specific embodiments disclosed, it becomes apparent that a projection map may be given one or more folds to conform more closely to the three-dimensional object it is to map, without losing its ability to lay flat. With reference to a map of the Earth on which land masses are the principal features, cuts are freely permissible through oceans and seas. However, if the side joining two such polygons crosses a major continental land mass, it should preferably represent a fold.

When selecting vertices for defining polygons, the closer together the vertices, the more nearly will an area mapped on the plane surface of such polygons conform in size, shape and distance to the true map on the sphere. The sides of such polygons may be irregular and may be laid out on the surface of a real sphere as "great circle arcs", thereby representing lines of minimum distance on the sphere between two such vertices.

In accordance with the invention, the principal features of a non-planar surface are projected onto one or more flat panels with a practical minimum of distortion. As noted above, this is not an absolute minimum since it is geometrically impossible to project a non-planar surface to a planar surface without some distortion. The amount of distortion is a trade-off taking into account other design factors, particularly, the size and location of the area being projected. For example, in the second and modified second embodiments, the positions of Antarctica and New Zealand are slightly distorted to allow both to be positioned on a single panel.

While the above description contains many specificities and has been described with particular reference to the mapping of an Earth globe a Moon globe and a map of the constellations it should not be construed as a limitation on the of the invention, but rather as exemplary of only several of the many possible embodiments thereof. Many other variations are possible, for example, maps of distant galaxies, maps of sea floor spreading and continental drift, models of hemoglobin and other molecules, models of the brain or other organs, inside-out star maps, advertising specialties, puzzles, gift items, navigational aids, memory joggers for commercial purposes, and many others. Additional applications of the invention will be suggested by different combinations of materials, sizes, joining and hinging methods and the like.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

I claim:

1. A method of forming a polyhedral approximation of a non-planar surface having at least principal features to be mapped with a practical minimum distortion of and minimal cuts through said principal features, said method comprising the steps of:
   (i) selecting a plurality of vertices on said non-planar surface, said plurality of vertices being dividable into vertex subgroups each of at least three vertices, the vertices in each of said vertex subgroups on essentially a single plane and defining an individual face area on said non-planar surface, and wherein at least a plurality of said vertex subgroups are selected so as to incorporate at least one of said principal features wholly within a panel area, said panel area consisting of at least one contiguous individual face area defined by said vertex subgroups;
   (ii) generating a separate panel of a size corresponding to each of said panel areas on said non-planar surface, wherein each panel comprises at least one flat polygon corresponding to one of said individual face areas; and (iii) projecting features from each of said individual face areas on said non-planar surface to a corresponding flat polygon, wherein the flat polygons of each panel are attached at their adjoining edges and all of said panels may be assembled into a polyhedral approximation of said non-planar surface.

2. The method of claim 1, further comprising the step of assembly of said panels into a polyhedral approximation of the non-planar surface to be mapped.

3. The method of claim 2, further comprising the steps of disassembly of said polyhedral approximation into a series of panels of said non-planar surface being mapped.

4. The method of claim 1, wherein said non-planar surface to be mapped is that of a celestial sphere.

5. The method of claim 4, wherein said celestial sphere is an Earth globe and said principal features are continental land masses.

6. The method of claim 4, wherein said celestial sphere is Earth's moon and said principal features are comprised of major craters, mountain ranges and lunar maria.

7. The method of claim 4, wherein said celestial sphere is a map of objects in Earth's sky and said principal features are recognized constellations.

8. A polyhedral approximation of a non-planar surface having at least principal features, said polyhedral approximation comprising a plurality of facets and capable of disassembly into panels, said facets being polygons of a plurality of different shapes and a plurality of different sizes and arranged in groups of at least one facet, a plurality of said groups individually shaped and sized so that each group within said plurality of groups accommodates substantially all of a principal feature with a practical minimum of distortion of said principal feature, whereupon when said plurality of groups are detached from said polyhedral and laid flat, each group within said plurality of groups depicts substantially all of said principal feature.

9. The polyhedral approximation of claim 8, wherein said non-planar surface is a celestial sphere.

10. The polyhedral approximation of claim 9, wherein said celestial sphere is Earth and said principal features are major land masses.

11. The polyhedral approximation of claim 9, wherein said celestral sphere is Earth's moon.

12. The polyhedral approximation of claim 9, wherein said celestral sphere is a map of objects in Earth's sky and said principal features are recognized constellations.

13. The polyhedral approximation of claim 8, wherein at least one of said facets has a curved surface which upon being laid flat becomes substantially planar.

14. A polyhedral approximation of a non-planar surface having at least principal features, with minimal distortion of said principal features, said polyhedral approximation comprising a plurality of flat polygonal panels connected along their edges and arranged generally like a sphere, at least two of said polygonal panels being of sizes and shapes so as to accommodate major portions of said principal features, and at least one of said panels being an irregular polygon.

15. The polyhedral approximation of the non-planar surface of claim 11, comprising fourteen panels of which six are quadrilateral panels and eight are irregular shaped hexagon panels.

16. The polyhedral approximation of the non-planar surface of claim 15, wherein said surface is of Earth and said principal features are major land masses of Earth.

17. The polyhedral approximation of the non-planar surface of claim 14, further comprising:
    connecting means for interconnecting said flat polygonal panels to form said generally sphere-like shape; and
    wherein each of said irregular polygonal panels has a main portion and a plurality of foldable tab portions, at least one of said tab portions having depicted thereon an area of said non-planar surface duplicative of an area depicted on a main portion of the interconnected adjacent polygon.

18. The polyhedral approximation of the non-planar surface of claim 17, comprising fourteen flat polygonal panels of which six are quadrilaterals and eight are irregular hexagons.

19. A polyhedral approximation of the non-planar surface of claim 17, wherein said surface is of Earth and the principal features are those major land masses covering between 1 and 11% of the total surface area of Earth.

20. The polyhedral approximation of claim 14, wherein at least one of said panels has a curved surface which upon being laid flat becomes substantially planar.

21. An assembly of flat polygonal panels for manufacture of a polyhedral approximation of a substantially spherical body having at least principal features with a practical minimum of distortion of said principal features, said assembly comprising:
    a plurality of flat polygonal panels, at least two of said polygonal panels being of different sizes and shapes from one another and at least one of said panels having a size and shape so as to accommodate on at least one of said different size panels a major portion of at least one of said principal features, and at least one of said plurality of flat polygonal panels being an irregular polygon;
    wherein of said plurality of flat polygonal panels has a main portion and a plurality of foldable tab portions, the fold line of at least one having between said main portion and said tab portions a slot into which a tongue positioned on an adjacent panel is inserted during assembly, at least one of said tab portions on one panel having depicted thereon an area of said substantially spherical body duplicative of an area depicted on a main portion of an adjacent panel;
    said plurality of panels cooperating to form said polyhedral approximation of a substantially spherical body.

22. The assembly of claim 21 wherein said substantially spherical body is Earth and there are fourteen flat polygonal panels of which six are quadrilaterals and eight are irregular hexagons.

23. The assembly of claim 21 wherein at least one of said foldable tab portions has accommodated thereon a portion of a principal feature which is so positioned on the main portion of said panel as to extend beyond the area of said main portion and onto said tab portion, thereby permitting a substantially complete depiction of said principal feature on said panel.

24. A knock-down pop-up polyhedral approximation of a celestial body having at least principal features, said celestial body comprising:
    fourteen flat polygonal panels connected along their edges and arranged generally like a sphere, six of said panels being quadrilaterals and eight of said panels being irregular hexagons, at least three of said polygonal panels being of sizes so as to accommodate substantially all of said principal features; and
    resilient connecting means for interconnecting said flat polyhedral panels to form said generally sphere-like shape, said resilient connecting means allowing the sphere to collapse upon application of downward pressure into an essentially flat member having approximately one-half of the surface of said celestial body depicted on each side.

25. The polyhedral approximation of a celestial body of claim 24, wherein said celestial body is Earth and said principal features are major land masses of Earth.

26. A projection of a substantially spherical body having at least principal features, said projection comprising:
    a plurality of polygonal panels, each of said panels connected along at least one of its edges to an edge of at least one other of said plurality of panels, wherein at least two of said panels are of sizes and shapes so as to accommodate major portions of said principal features with a practical minimum of distortion and at least one of said panels is an irregular polygon.

27. The projection of claim 26, wherein there are 14 polygonal panels of which six are quadrilaterals and eight are irregular hexagons, each of the hexagons having three longer sides and three shorter sides.

28. A projection of claim 27 wherein said body is Earth and said principal features are major land masses.

29. The projection of claim 28, wherein each of said irregular hexagon panels has a main portion and a plurality of tab portions, and at least one of said tab portions has depicted thereon an area of Earth duplicative of an area depicted on a main portion of an adjacent panel.

30. The projection of claim 29, wherein said tab portions are foldable, and at least one fold has a slot into which a tongue from an adjacent panel is insertable.

31. The projection of claim 28, wherein at least a major portion of a projection of North America, Europe, Antarctica, South America, Asia and East Asia and Africa are each contained on one of said irregular hexagons and a least a major portion of a projection of Australia is contained on one of said quadrilaterals.

32. A polyhedral approximation of an Earth globe, with a plurality of facets, said facets comprising:
   an upper irregular six-sided facet at an uppermost portion of said globe;
   a lower irregular six-sided facet at a lowermost portion of said globe;
   a band of triangle shaped facets extending around an equator of said earth globe, said triangle shaped facets oriented in alternating upward and downward directions; and
   a pair of bands of trapezoid shaped facets, one of said bands of trapezoid shaped facets extending from the band of triangle shaped facets to the upper irregular six-sided facet and the other of said bands of trapezoid shaped facets extending from the band of triangle shaped facets to the lower irregular six-sided facet.

33. The polyhedral approximation of a globe of claim 32, wherein there are twelve facets in said band of triangle shaped facets and six facets in each of said bands of trapezoid shaped facets.

34. The polyhedral approximation of a globe of claim 33, wherein each of said six sided facets is on a plane perpendicular to an axis of the globe.

35. The polyhedral approximation of a globe of claim 32, wherein the band of triangle shaped facets extends widthwise from an approximate latitude of 23° N to an approximate latitude of 23° S.

36. The polyhedral approximation of a globe of claim 32, wherein at least one contiguous plurality of said trapezoid shaped facets is shaped and sized to incorporate, when connected, the majority of a major land mass.

37. A polyhedral approximation of an Earth globe, with a plurality of facets, said facets comprising:
   an upper polygonal facet perpendicular to an axis of said globe at an uppermost portion of said globe;
   a lower polygonal facet perpendicular to an axis of said globe at a lowermost portion of said globe;
   a band of triangle shaped facets extending around an equator of said earth globe, said triangle shaped facets oriented in alternating upward and downward directions; and
   a pair of bands of trapezoid shaped facets, one of said bands of trapezoid shaped facets extending from the band of triangle shaped facets to the upper polygonal facet and the other of said bands of trapezoid shaped facets extending from the band of triangle shaped facets to the lower polygonal facet.

38. The polyhedral approximation of a globe of claim 37, wherein the band of triangle shaped facets extends widthwise from an approximate latitude of 23° N to an approximate latitude of 23° S.

39. A projection of an Earth globe, said projection comprising:
   a first polygonal panel having an uppermost portion of said globe projected thereon;
   a second polygonal panel having a lowermost portion of said globe projected thereon;
   a plurality of triangle shaped panels having projected thereon an area of said Earth globe extending around an equator of said earth globe, said triangle shaped oriented in alternating upward and downward directions; and
   a first and second plurality of trapezoid shaped panels, one of said first plurality of trapezoid shaped panels having projected thereon the entire area of said Earth globe between areas projected onto said plurality of triangle shaped panels and said first polygonal panel and said second plurality of trapezoid shaped panels having projected thereon the entire area of said Earth globe between areas projected onto said plurality of triangle shaped panels and said second polygonal panel.

40. The projection of a globe of claim 39, wherein there are twelve panels in said plurality of triangle shaped panels and six panels in each of said first and second plurality of trapezoid shaped panels.

41. A polyhedral approximation of an Earth globe comprising:
   a plurality of triangle shaped facets extending around an equator of said Earth globe, said triangle shaped facets oriented in alternating upward and downward directions; and
   a plurality of partial gore shaped facets, each of said partial gore shaped facets corresponding to one of said triangle shaped facets and each of said partial gore shaped facets having a base equal in length to a base of its corresponding triangle shaped facet, the base of said partial gore shaped facet being adjacent to the base of its corresponding triangle shaped facet.

42. The polyhedral approximation of the Earth globe of claim 41, wherein said plurality of triangle shaped facets is twelve.

43. The polyhedral approximation of an Earth globe of claim 41, wherein each of said facets is formed of a panel and said panels are detachably connected to one another.

44. A, polyhedral approximation of a non-planar surface having at least principal features, with a plurality of facets arranged to achieve a practical minimum of distortion of said principal features thereon, said facets comprising:
   an upper six-sided facet at an uppermost portion of said body;
   a lower six-sided facet at a lowermost portion of said body;
   a band of trapezoid shaped facets extending around an equator of said body;
   a pair of bands of triangle shaped facets each extending longitudinally, the first of said bands of triangle shaped facets extending from the band of trapezoid shaped facets to the upper six-sided facet and the second of said bands of triangle shaped facets extending from the band of trapezoid shaped facets to the lower six-sided facet.

45. The polyhedral approximation of the non-planar surface of claim 44, wherein said body is Earth and said first band has twenty-two triangle shaped facets and said second band has eighteen triangle shaped facets.

46. The polyhedral approximation of the non-planar surface of claim 45 wherein said first band has an upper part of eighteen triangle shaped facets extending longitudinally around said body and a lower part of four triangle shaped facets south of said upper part.

47. The polyhedral approximation of the non-planar surface of claim 44, wherein said non-planar surface is a map of objects in Earth's sky.

48. The polyhedral approximation of the non-planar surface of claim 44, wherein said surface is of Earth's moon.

49. A projection of a celestial sphere having principal features comprising a plurality of polygons arranged in panels to achieve a practical minimum of distortion of principal features, comprising:

a first irregular hexagon onto which is projected an uppermost portion of said sphere, said first irregular hexagon having been cut into portions of at least two panels;

a second irregular hexagon onto which is projected a lowermost portion of said sphere;

a series of trapezoids onto which is projected a substantial portion of an area extending along the equator of said sphere, and a pair of series of triangles, one of said series having projected thereon an area of the sphere extending above the area projected onto said trapezoids and the other of said series having projected thereon an area of said sphere extending below an area projected onto said trapezoids.

50. The projection of the Earth globe of claim 49, wherein each of said polygons is connected to at least one other polygon and at least one of said connections is detachable.

51. The projection of the celestial sphere of claim 49, wherein there are 54 polygons.

52. A projection of an Earth globe comprising a plurality of polygons arranged in panels, each panel including at least one polygon, to achieve a practical minimum of distortion of principal land masses, comprising a first irregular hexagon onto which is projected an uppermost portion of said globe, said first irregular hexagon having been cut into at least two portions;

a second irregular hexagon onto which is projected a lowermost portion of said globe;

a series of trapezoids onto which is projected a substantial portion of an area extending along the equator of said globe, and a pair of series of triangles, a first of said series having projected thereon an area of the Earth globe extending north of the area projected onto said trapezoids and a second of said series having projected thereon an area extending below an area projected onto said trapezoids.

53. The projection of claim 52 having 23 polygons.

54. The projection of claim 52, wherein there are twenty-two triangles in the first of said series of triangles and eighteen triangles in the second of said series of triangles.

55. A knock-down polyhedral approximation of a celestial body having principal features, said celestial body comprising:

fourteen flat polygonal panels arranged generally like a sphere, six of said panels being quadrilaterals and eight of said panels being irregular hexagons, at least one of said polygonal panels being of a size so as to accommodate substantially all of one of said principal features; and connecting means for interconnecting said flat polyhedral panels along their edges to form said generally sphere-like shape, a plurality of said connecting means being disengageable to allow the celestial body to collapse into an essentially flat member having a part of the surface of said celestial body depicted on each side.

56. The polyhedral approximation of a celestial body of claim 55, wherein said celestial body is Earth and said principal features are major land masses of Earth.

* * * * *

UNITED STATES PATENT AND TRADEMARK OFFICE
CERTIFICATE OF CORRECTION

PATENT NO. : 5,222,896

DATED : June 29, 1993

INVENTOR(S) : THOMAS E. SMITH, JR.

Page 1 of 4

It is certified that error appears in the above-indentified patent and that said Letters Patent is hereby corrected as shown below:

On the title page: Item

[56] REFERENCES CITED
OTHER PUBLICATIONS
"Buckminister" should read --Buckminster--.

COLUMN 2
Line 11, "minister" should read --minster--.
Line 40, "sections" should read --sections.--.

COLUMN 3
Line 14, "minimal" should read --minimum--.

COLUMN 4
Line 32, "FIGS. 7(A)-7(N)" should read --FIGS. 7(a)-7(n)--.
Line 65, "mass." should read --masses.--.

UNITED STATES PATENT AND TRADEMARK OFFICE
CERTIFICATE OF CORRECTION

PATENT NO. : 5,222,896            Page 2 of 4
DATED : June 29, 1993
INVENTOR(S) : THOMAS E. SMITH, JR.

It is certified that error appears in the above-indentified patent and that said Letters Patent is hereby corrected as shown below:

COLUMN 6
    Line 41, "facets 44-52" should read --facets 41-52--.
    Line 50, "20°N-90°" should read --20°N-90°E--.
    Line 59, "S-145°W." should read --S-179°W.--.
    Line 61, "18°N-179°W," should read --16°N-179°W,--.
    Line 62, "S-179°1W." should read --S-145°W.--.

COLUMN 7
    Line 5, "by vertices" should be deleted.
    Line 10, "20°N-180°W," should read --20°N-18°W,--.
    Line 47, "vertice" should read --vertices--.
    Line 63, "out" should read --cut--.

COLUMN 8
    Line 55, "maybe" should read --may be--.

COLUMN 11
    Line 12, "lapping" should read --mapping--.

COLUMN 13
    Line 15, "mases," should read --masses,--.
    Line 16, "panel 22," should read --panel 222,--.

UNITED STATES PATENT AND TRADEMARK OFFICE
CERTIFICATE OF CORRECTION

PATENT NO. : 5,222,896
DATED : June 29, 1993
INVENTOR(S) : THOMAS E. SMITH, JR.

It is certified that error appears in the above-indentified patent and that said Letters Patent is hereby corrected as shown below:

COLUMN 14
    Line 48, "fold" should read --a fold--.
    Line 50, "Preceding" should read --Proceeding--.
    Line 61, "Africa The" should read --Africa. The--.

COLUMN 15
    Line 21, "Peruvia" should read --Peruvian--.

COLUMN 16
    Line 61, "gle The" should read --gle. The--.

COLUMN 18
    Line 67, "later" should read --late--.

COLUMN 19
    Line 47, "globe a" should read --globe, a--.
    Line 48, "constellations" should read --constellations,--.
    Line 49, "the of" should read --the scope of--.

UNITED STATES PATENT AND TRADEMARK OFFICE
CERTIFICATE OF CORRECTION

PATENT NO. : 5,222,896
DATED : June 29, 1993
INVENTOR(S) : THOMAS E. SMITH, JR.

It is certified that error appears in the above-indentified patent and that said Letters Patent is hereby corrected as shown below:

COLUMN 21
    Line 18, "claim 11," should read --claim 14,--.
    Line 39, ",approximation" should read --approximation--.
    Line 61, "wherein" should read --wherein at least one--.

COLUMN 22
    Line 28, "polyhedral" should read --polygonal--.

COLUMN 23
    Line 63, "shaped" should read --shaped panels--.

COLUMN 25
    Line 18, "Earth globe" should read --celestial sphere--.

COLUMN 26
    Line 10, "23 polygons." should read --54 polygons.--.

Signed and Sealed this

Third Day of May, 1994

*Attest:*

BRUCE LEHMAN

*Attesting Officer*     *Commissioner of Patents and Trademarks*